US010826666B2

(12) United States Patent
Ogawa et al.

(10) Patent No.: US 10,826,666 B2
(45) Date of Patent: *Nov. 3, 2020

(54) COMMUNICATION APPARATUS AND COMMUNICATION METHOD THEREOF

(71) Applicant: Sun Patent Trust, New York, NY (US)

(72) Inventors: Yoshihiko Ogawa, Kanagawa (JP); Akihiko Nishio, Osaka (JP); Seigo Nakao, Osaka (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/532,242

(22) Filed: Aug. 5, 2019

(65) Prior Publication Data
US 2019/0363855 A1 Nov. 28, 2019

Related U.S. Application Data

(63) Continuation of application No. 16/040,304, filed on Jul. 19, 2018, now Pat. No. 10,419,189, which is a (Continued)

(30) Foreign Application Priority Data

Jun. 21, 2010 (JP) ................................ 2010-140751
Sep. 30, 2010 (JP) ................................ 2010-221392

(51) Int. Cl.
H04W 72/04 (2009.01)
H04L 5/00 (2006.01)
(Continued)

(52) U.S. Cl.
CPC ......... H04L 5/0053 (2013.01); H04B 7/0413 (2013.01); H04B 7/0452 (2013.01);
(Continued)

(58) Field of Classification Search
CPC ...... H04W 72/04; H04W 88/08; H04W 76/00
See application file for complete search history.

(56) References Cited

U.S. PATENT DOCUMENTS 8,243,673 B2  8/2012 Hoshino
8,503,425 B2  8/2013 Chung et al.
(Continued)

FOREIGN PATENT DOCUMENTS

CA    2 725 684 A1    12/2009
CN    101534548 A    9/2009
(Continued)

OTHER PUBLICATIONS

"3rd Generation Partnership Project; Technical Specification Group Radio Access Network; Evolved Universal Terrestrial Radio Access (E-UTRA); Multiplexing and channel coding (Release 8)," Technical Specification, 3GPP TS 36.212 V8.7.0, May 2009, 60 pages.
(Continued)

Primary Examiner — Michael J Moore, Jr.
Assistant Examiner — Prenell P Jones
(74) Attorney, Agent, or Firm — Seed IP Law Group LLP

(57) ABSTRACT

This invention is directed to a terminal apparatus capable of preventing the degradation of reception quality of control information even in a case of employing SU-MIMO transmission system. A terminal (200), which uses a plurality of different layers to transmit two code words in which control information is placed, comprises: a resource amount determining unit (204) that determines, based on a lower one of the encoding rates of the two code words or based on the average value of the reciprocals of the encoding rates of the two code words, resource amounts of control information in the respective ones of the plurality of layers; and a transport signal forming unit (205) that places, in the two code words,
(Continued)

the control information modulated by use of the resource amounts, thereby forming a transport signal.

4 Claims, 10 Drawing Sheets

Related U.S. Application Data continuation of application No. 15/664,689, filed on Jul. 31, 2017, now Pat. No. 10,057,035, which is a continuation of application No. 15/294,301, filed on Oct. 14, 2016, now Pat. No. 9,755,805, which is a continuation of application No. 14/447,259, filed on Jul. 30, 2014, now Pat. No. 9,509,477, which is a continuation of application No. 13/699,557, filed as application No. PCT/JP2011/003198 on Jun. 7, 2011, now Pat. No. 8,830,911.

(51) Int. Cl.
| | | |
|---|---|---|
| H04L 1/16 | (2006.01) | |
| H04L 1/18 | (2006.01) | |
| H04B 7/0413 | (2017.01) | |
| H04B 7/0452 | (2017.01) | |
| H04L 27/26 | (2006.01) | |

(52) U.S. Cl.
CPC .......... *H04L 1/1671* (2013.01); *H04L 1/1861* (2013.01); *H04L 5/0023* (2013.01); *H04L 5/0055* (2013.01); *H04L 5/0057* (2013.01); *H04W 72/0406* (2013.01); *H04W 72/0413* (2013.01); *H04L 27/2636* (2013.01)

(56) References Cited

U.S. PATENT DOCUMENTS

| | | |
|---|---|---|
| 8,503,569 B2 | 8/2013 | Kinnunen et al. |
| 8,619,719 B2 | 12/2013 | Wengerter et al. |
| 8,660,070 B2 | 2/2014 | Miki et al. |
| 2007/0275681 A1 | 11/2007 | Hamada |
| 2009/0196204 A1 | 8/2009 | Astely et al. |
| 2009/0232101 A1 | 9/2009 | Papasakellariou et al. |
| 2009/0262687 A1 | 10/2009 | Furata |
| 2009/0268844 A1 | 10/2009 | Kinnunen et al. |
| 2009/0323613 A1 | 12/2009 | Frederiksen et al. |
| 2010/0027697 A1 | 2/2010 | Malladi et al. |
| 2010/0061345 A1 | 3/2010 | Wengerter et al. |
| 2010/0183056 A1 | 7/2010 | Hoshino |
| 2010/0195624 A1* | 8/2010 | Zhang ............... H04B 7/0413 370/335 |
| 2011/0051824 A1 | 3/2011 | Kim et al. |
| 2011/0176502 A1 | 7/2011 | Chung et al. |
| 2011/0228759 A1 | 9/2011 | Futagi et al. |
| 2012/0039205 A1 | 2/2012 | Kogure et al. |
| 2012/0051245 A1 | 3/2012 | Nam et al. |
| 2012/0207052 A1 | 8/2012 | Papasakellariou et al. |
| 2013/0016687 A1 | 1/2013 | Yang et al. |
| 2013/0163546 A1 | 6/2013 | Frederiksen et al. |
| 2013/0195122 A1 | 8/2013 | Li |
| 2013/0238954 A1 | 9/2013 | Jang et al. |
| 2013/0329667 A1 | 12/2013 | Wengerter et al. |

FOREIGN PATENT DOCUMENTS

| | | |
|---|---|---|
| CN | 101584142 A | 11/2009 |
| CN | 101682381 A | 3/2010 |
| JP | 2009-189007 A | 8/2009 |
| WO | 2010/064407 A1 | 6/2010 |

OTHER PUBLICATIONS

"3rd Generation Partnership Project; Technical Specification Group Radio Access Network; Evolved Universal Terrestrial Radio Access (E-UTRA); Multiplexing and channel coding (Release 9)," Technical Specification, 3GPP TS 36.212 V9.2.0, Jun. 2010, 61 pages.
"3rd Generation Partnership Project; Technical Specification Group Radio Access Network; Evolved Universal Terrestrial Radio Access (E-UTRA); Physical layer procedures (Release 8)," Technical Specification, 3GPP TS 36.213 V8.8.0, Sep. 2009, 77 pages.
English Translation of Chinese Search Report dated Oct. 10, 2014, for corresponding CN Patent Application No. 201180026631.5, 2 pages.
Extended European Search Report, dated May 30, 2018, for the related European Patent Application No. 18152437.2-1219 / 3340675, 10 pages.
International Search Report, dated Aug. 30, 2011, for corresponding International Application No. PCT/JP2011/003198, 2 pages. (W/ English Translation).
Invitation to Respond to Written Opinion, dated Nov. 11, 2013, for corresponding Singapore Patent Application No. 201209032-0, 13 pages.
Qualcomm Europe, LGE, Panasonic, Huawei, InterDigital, Motorola, "Clarify some parameters for determining control resources on PUSCH," R1-092036, 3GPP TSG-RAN-WG1 Meeting #57, San Francisco, May 4-8, 2009, 6 pages.
Qualcomm Incorporated, "UCI Multiplexing for SU-MIMO Transmission," R1-102762, Agenda Item: 6.4.3, 3GPP TSG-RAN WG1 #61, Montreal, Canada, May 10-14, 2010, 4 pages.
Stiglmayr et al., "Adaptive Coding and Modulation in OFDM Systems using BICM and Rate-Compatible Punctured Codes," Proc. European Wireless Conf., Paris, Apr. 2007, Section I-II, 7 pages.

* cited by examiner

| NOTIFICATION INDEX | AMOUNT OF OFFSET (A/N) |
|---|---|
| 0 | 2.000 |
| 1 | 2.500 |
| 2 | 3.125 |
| 3 | 4.000 |

FIG.2

| SIGNALING | #A | #B | #C | #D | #E | #F |
|---|---|---|---|---|---|---|
| CORRECTION FACTOR $\gamma_{offset}$ | 0.1 | 0.3 | 0.6 | 1.0 | 1.3 | 1.6 |

FIG. 6

| DIFFERENCE IN NUMBER OF LAYERS | 0 | 1 | 2 | 3 |
|---|---|---|---|---|
| CORRECTION FACTOR $c_{offset}$ | 1.0 | 0.8 | 0.6 | 0.4 |

FIG. 7

| DIFFERENCE IN NUMBER OF LAYERS | 0 | 1 | 2 | 3 |
|---|---|---|---|---|
| CORRECTION FACTOR $a_{offset}$ | 1.0 | 1.2 | 1.4 | 1.8 |

FIG.8

COMMUNICATION APPARATUS AND COMMUNICATION METHOD THEREOF

BACKGROUND

Technical Field

The present invention relates to a terminal apparatus and a communication method thereof.

Description of the Related Art

In the uplink of the 3rd Generation Partnership Project Long Term Evolution (3GPP LTE), single carrier transmission is performed to maintain a low cubic metric (CM). More specifically, in the presence of data signals, the data signals and control information are time multiplexed and transmitted in a physical uplink shared channel (PUSCH). The control information includes response signals (positive/negative acknowledgments (ACK/NACK), hereinafter called "ACK/NACK signals") and channel quality indicators (hereinafter called the "CQIs"). Data signals are divided into code blocks (CB), and a cyclic redundancy check (CRC) code is added to each code block for error correction.

ACK/NACK signals and CQIs have different allocation methods. (See Non-Patent Literatures 1 and 2, for example). More specifically, ACK/NACK signals are allocated in parts of a data signal resource by puncturing parts of the data signals (4 symbols) mapped to the resource adjacent to Reference Signals (RSs) (i.e., overwriting the data signals with the ACK/NACK signals). In contrasts, CQIs are allocated over entire sub-frames (2 slots). Since the data signals are allocated in resources other than the CQI allocated resource, no CQIs are punctured (see FIG. 1.) The reasons for the difference in allocation are as follows: the allocation or non-allocation of an ACK/NACK signal depends on the presence or absence of data signals in downlink. In other words, it is more difficult to predict the occurrence of ACK/NACK signals than it is to predict that of CQIs; hence, puncturing capable of allocating the resource of a suddenly occurring ACK/NACK signal is used during mapping of ACK/NACK signals. Meanwhile, the timing of CQI transmission (i.e., sub-frames) is predetermined based on notification information, which allows the determination of allocation of data signal and CQI resources. Since ACK/NACK signals are important information, they are assigned to symbols in the vicinity of pilot signals, which have high estimation accuracy of transmission paths, thereby reducing ACK/NACK signal errors.

A modulation and coding rate scheme (MCS) for data signals in uplink is determined by a base station apparatus (hereinafter called the "base station" or "eNB") based on the channel quality of the uplink. An MCS for control information in the uplink is determined by adding an offset to the MCS for data signals (see Non-Patent Literature 1, for example). More specifically, since control information is more important than data signals, the MCS for control information is set to a lower transmission rate than the MCS for data signals. This guarantees high-quality transmission of control information.

For example, in the 3GPP LTE uplink, if control information is transmitted in a PUSCH, the amount of resource assigned to the control information is determined based on a coding rate indicated in the MCS for data signals. More specifically, as shown in equation 1 below, the amount of the resource Q assigned to the control information is obtained by multiplying the inverse of the coding rate of data signal by an offset.

(Equation 1)

$$Q = \left\lceil \frac{(O+P) \cdot M_{sc}^{PUSCH\text{-}initial} \cdot N_{Symb}^{PUSCH\text{-}initial} \cdot \beta_{offset}^{PUSCH}}{\sum_{r=0}^{C-1} K_r} \right\rceil \quad [1]$$

With reference to equation 1, O indicates the number of bits in control information (i.e., ACK/NACK signal or CQI) and P indicates the number of bits for error correction added to the control information (for example, the number of bits in CRC and in some cases, P=0). The total of O and P (O+P) indicates the number of bits in uplink control information (UCI). $M_{SC}^{PUSCH\text{-}initial}$, $N_{Symb}^{PUSCH\text{-}initial}$, C and $K_r$ indicate the transmission bandwidth for PUSCH, the number of symbols transmitted in the PUSCH per unit transmission bandwidth, the number of code blocks into which data signals are divided, and the number of bits in each code block, respectively. UCI (i.e., control information) includes ACK/NACK, CQI, a rank indicator (RI), which indicates rank information, and a precoding matrix indicator (PMI), which provides precoding information.

With reference to equation 1, ($M_{SC}^{PUSCH\text{-}initial} \cdot N_{Symb}^{PUSCH\text{-}initial}$) indicates the amount of transmission data signal resources, $\Sigma K_r$ indicates the number of bits in a single data signal (i.e., the total number of bits in code blocks into which the data signal is divided). Accordingly, $\Sigma K_r / (M_{SC}^{PUSCH\text{-}initial} \cdot N_{Symb}^{PUSCH\text{-}initial})$ represents a value that depends the coding rate of the data signal (hereinafter, called "coding rate"). The $(M_{SC}^{PUSCH\text{-}initial} \cdot N_{Symb}^{PUSCH\text{-}initial}) / \Sigma K_r$ shown in equation 1 indicates the inverse of the coding rate of data signal (i.e., the number of resource elements (RE: resource composed of one symbol or one sub-carrier) used to transmit one bit). $\beta_{offset}^{PUSCH}$ indicates the amount of offset by which the above-mentioned inverse of the coding rate of data signal is multiplied, and is reported from a base station to each terminal apparatus (hereinafter, called the "terminal" or UE) via upper layers. More specifically, a table indicating candidates of the amounts of offset $\beta_{offset}^{PUSCH}$ is defined for each part of control information (i.e., ACK/NACK signal and CQI). For example, a base station selects one amount of offset $\beta_{offset}^{PUSCH}$ from the table (for example, see FIG. 2) containing candidates for the amount of offset $\beta_{offset}^{PUSCH}$ defined for ACK/NACK signal and then notifies a terminal of a notification index corresponding to the selected amount of offset. As is evident from the term "PUSCH-initial," ($M_{SC}^{PUSCH\text{-}initial} \cdot N_{Symb}^{PUSCH\text{-}initial}$) represents the amount of transmission resource for the initial transmission of a data signal.

The standardization of 3GPP LTE-Advanced, which provides higher-speed transmission than 3GPP LTE, has started. The 3GPP LTE-Advanced system (hereinafter, may be called "LTE-A system") follows the 3GPP LTE system (hereinafter, called "LTE system"). In 3GPP LTE-Advanced, base stations and terminals that can communicate in a wideband frequency range of 40 MHz or higher will be introduced to achieve downlink transmission rates of up to 1 Gbps.

In an LTE-Advanced uplink, the use of single user multiple input multiple output (SU-MIMO) transmission in which a single terminal transmits data signals in a plurality of layers has been studied. In the SU-MIMO communications, data signals are generated in a plurality of code words (CWs), each of which is transmitted in different layers. For example, CW#0 is transmitted in layers #0 and #1, and CW#1 is transmitted in layers #2 and #3. In each CW, a data signal is divided into a plurality of code blocks and CRC is added to each code block for error correction. For example, a data signal in CW#0 is divided into five code blocks and a data signal in CW#1 into eight code blocks. The "code word" can be regarded as a unit of data signals to be retransmitted. The "layer" is a synonym of a stream.

Unlike the above-mentioned LTE-A system, the LTE systems disclosed in the above-mentioned Non-Patent Literatures 1 and 2 assume the use of the non-MIMO transmission in uplink. In the non-MIMO transmission, a single layer is used at each terminal.

In the SU-MIMO transmission, control information is transmitted in a plurality of layers in some cases, and it is transmitted in one of the plurality of layers in other cases. For example, in an LTE-Advanced uplink, allocation of an ACK/NACK signal in a plurality of CWs and of a CQI in a single CW has been studied. More specifically, since an ACK/NACK signal is the most important information in all parts of control information, the same ACK/NACK signal is allocated in all the CWs (i.e., the same information is assigned to all layers (rank-1 transmission)), thereby reducing inter-layer interference. The same ACK/NACK signals transmitted in a plurality of CWs (i.e., space-division multiplexed) are combined into a single part of information on a transmission path, thereby eliminating the need for the receiving side (base station) to separate the ACK/NACK signals transmitted in a plurality of CWs. Accordingly, inter-layer interference that may occur on the receiving side during the separation does not occur. Thus, high receiving quality can be achieved. Note that the description below assumes that the control information is an ACK/NACK signal and allocated in two CWs (CW#0 and CW#1).

CITATION LIST

Non-Patent Literatures

NPL1
TS36.212 v8.7.0, "3GPP TSG RAN; Evolved Universal Terrestrial Radio Access (E-UTRA); Multiplexing and channel coding"
NPL2
TS36.213 v8.8.0, "3GPP TSG RAN; Evolved Universal Terrestrial Radio Access (E-UTRA); Physical Layer Procedure"

BRIEF SUMMARY

Technical Problem

In the SU-MIMO communications, when transmitting control information in a PUSCH, the amount of the resource required to allocate control information (ACK/NACK signals) is determined based on the coding rate of one of the two CWs, just as in the LTE system (for example, Non-Patent Literature 1). For example, as shown in equation 2 below, the coding rate $r_{CW\#0}$ of CW#0 of the two CWs (i.e., CW#0 and CW#1) is used to determine the amount of the resource $Q_{CW\#0}$ required to assign control information in each layer.

(Equation 2)

$$Q_{CW\#0} = \left\lceil (O+P) \times \frac{1}{r_{CW\#0}} \times \beta_{offset}^{PUSCH} / L \right\rceil \quad [2]$$

In equation 2, L indicates the total number of layers (the total number of layers to which CW#0 and CW#1 are assigned). In equation 2, as in equation 1, the amount of the resource required to allocate control information in each layer is determined by multiplying the inverse ($1/r_{CW\#0}$) of the coding rate $r_{CW\#0}$ by an offset amount $\beta_{offset}^{PUSCH}$ and then dividing the result by the total number of layers L. A terminal uses the amount of the resource $Q_{CW\#0}$ determined in accordance with equation 2 to transmit CW#0 and CW#1 assigned to the layers (i.e., L layers).

In this case, however, when CW#0 and CW#1 are combined in the base station, there is a concern that the reception quality of control information after the combination may be poor and fail to meet a requirement.

CW#0, for example, is transmitted using the amount of the resource $Q_{CW\#0}$ which is determined based on the coding rate $r_{CW\#0}$ of CW#0, that is, the amount of resource appropriate for CW#0. Accordingly, control information allocated in CW#0 is likely to meet required reception quality. In contrast, CW#1 is transmitted using the amount of the resource $Q_{CW\#0}$ which is determined based on the coding rate $r_{CW\#0}$ of CW#0 (that is, the other CW). Thus, control information allocated in CW#1 may degrade in the reception quality if the layer to which CW#1 is allocated has a poor transmission path environment.

As shown in FIG. 3, for example, CW#0 is allocated in layer #0 and layer #1 and CW#1 is allocated in layer #2 and layer #3. A description is given of a case where the coding rate of CW#0 is higher than the coding rate of CW#1. To put it differently, the amount of resource required for the control information allocated in CW#0 is smaller than that required for the control information allocated in CW#1.

In layers #0 and #1, control information allocated in CW#0 can meet the reception quality required by each CW (i.e., reception quality required for control information for the LTE system/the number of CWs). In contrast, in layers #2 and #3, the control information allocated in CW#1 has an amount of resource determined based on CW#0; thus, the amount of resource to meet the required reception quality runs short, thus failing to meet the reception quality required for each CW. Thus, a combination of the control information allocated in CW#0 and CW#1 may result in a lower reception quality than that required for all the CWs (i.e., reception quality required for control information in the LTE system).

Accordingly, it is an object of the present invention to provide a terminal capable of preventing the degradation of reception quality of control information even in a case of adopting the SU-MIMO transmission method, and also to provide a communication method thereof.

Solution to Problem

A first aspect of the present invention provides a terminal apparatus that transmits two code words to which control information is allocated, in a plurality of different layers, the apparatus including: a determination section that determines the amount of resource of the control information in each of the plurality of layers; and a transmission signal generating section that generates a transmission signal through modulation of the control information using the amount of the resource and allocation of the modulated control information to the two code words, in which the determination section determines the amount of the resource based on a lower coding rate of the coding rates of the two code words, or the average of the inverses of the coding rates of the two code words.

A second aspect of the present invention provides a communication method including: determining an amount of resource of control information in each of a plurality of different layers in which two code words are transmitted, the control information being allocated in the two code words; modulating the control information using the amount of the resource; and allocating the modulated control information in the two code words to generate a transmission signal, in which the amount of the resource is determined based on a lower coding rate of the coding rates of the two code words, or the average of the inverses of the coding rates of the two code words.

Advantageous Effects of Invention

The present invention can prevent the degradation of reception quality of control information even in a case of adopting the SU-MIMO transmission method.

BRIEF DESCRIPTION OF THE SEVERAL VIEWS OF THE DRAWINGS

FIG. 2 is a diagram provided for describing a table containing candidates for an offset amount in the conventional case;

FIG. 6 shows exemplary correction factors according to Embodiment 1 of the present invention;

FIG. 7 shows exemplary correction factors according to Embodiment 2 of the present invention;

FIG. 8 shows exemplary correction factors according to Embodiment 2 of the present invention;

DETAILED DESCRIPTION

Figure 1:
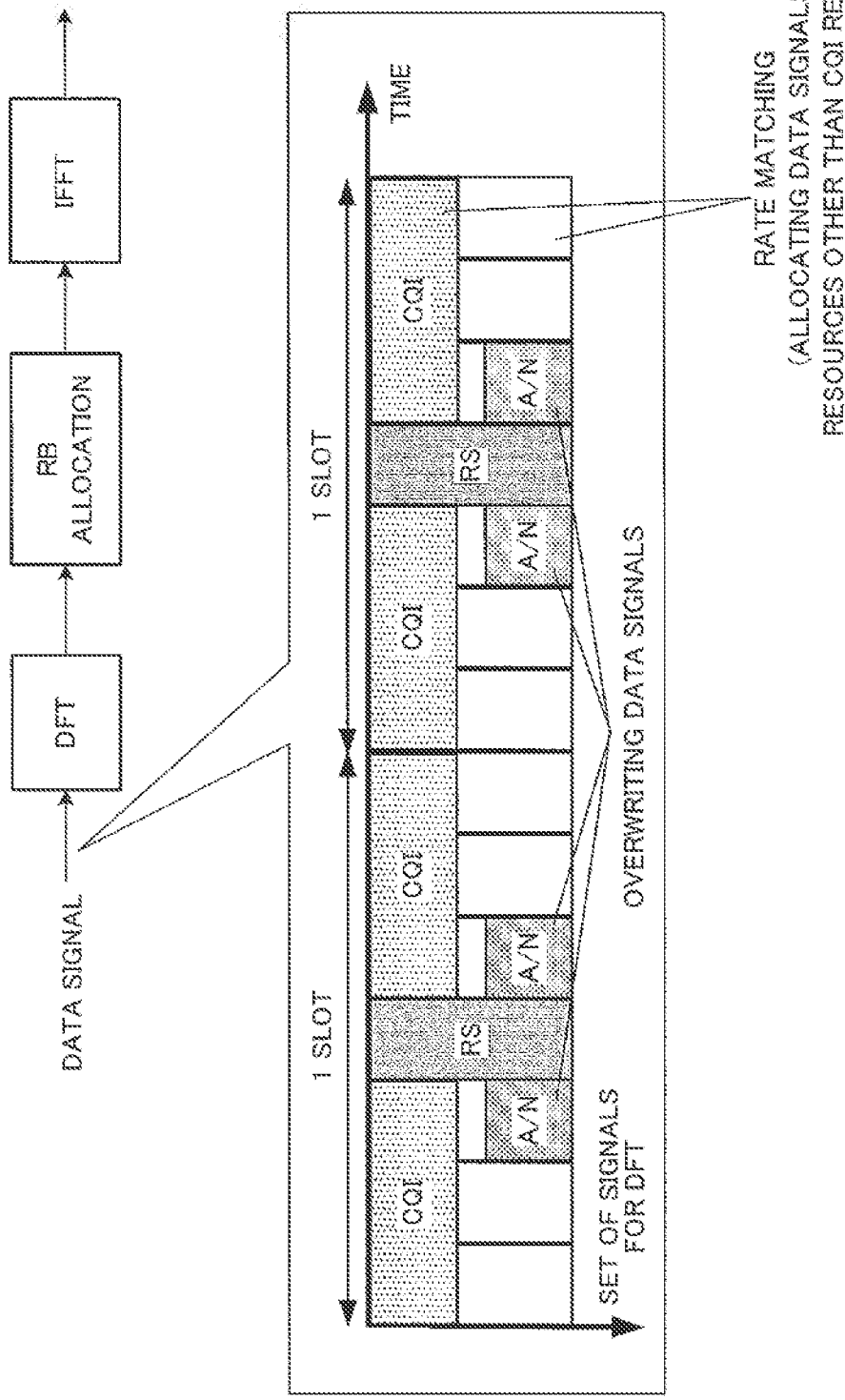
FIG. 1 shows a conventional allocation of ACKs/NACKs and CQIs.
Figure 3:
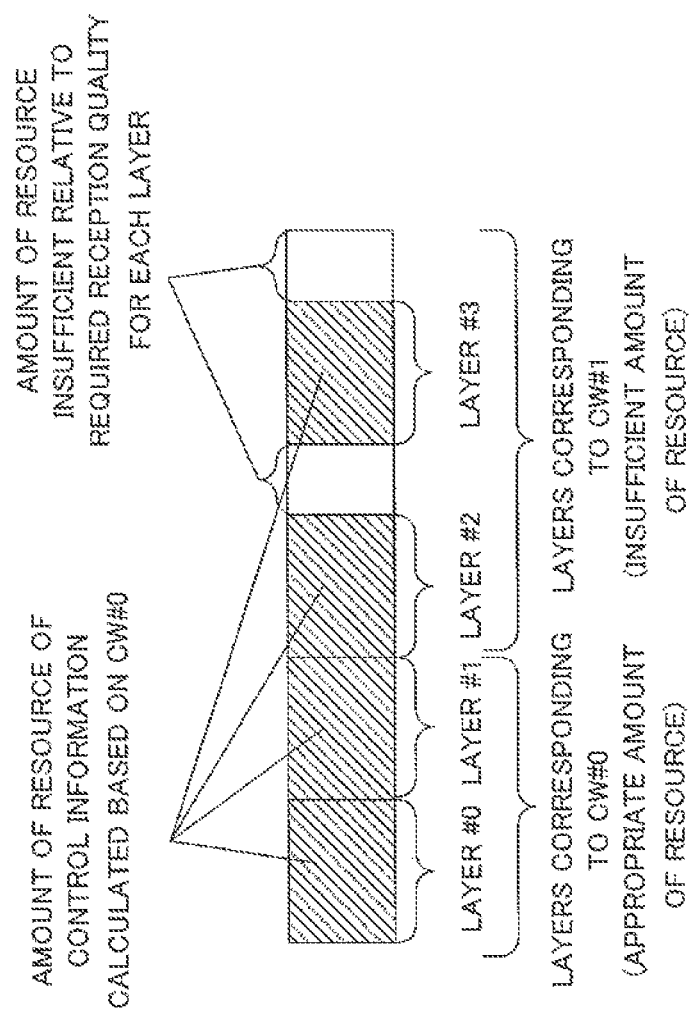
FIG. 3 is a diagram provided for describing a technical problem.

Embodiments of the present invention will be hereinafter described in detail with reference to the accompanying drawings. In the embodiments, the same components are given the same reference numerals without redundant descriptions.

Embodiment 1

(Overview of Communication System)

In the following description, a communications system including base station 100 and terminal 200 as described hereinafter is an LTE-A system, for example. Base station 100 is an LTE-A base station, and terminal 200 is an LTE-A terminal, for example. The communication system is assumed to be a frequency division duplex (FDD) system. Terminal 200 (LTE-A terminal) can be switched between non-MIMO and SU-MIMO transmission modes.

(Configuration of Base Station)

Figure 4:
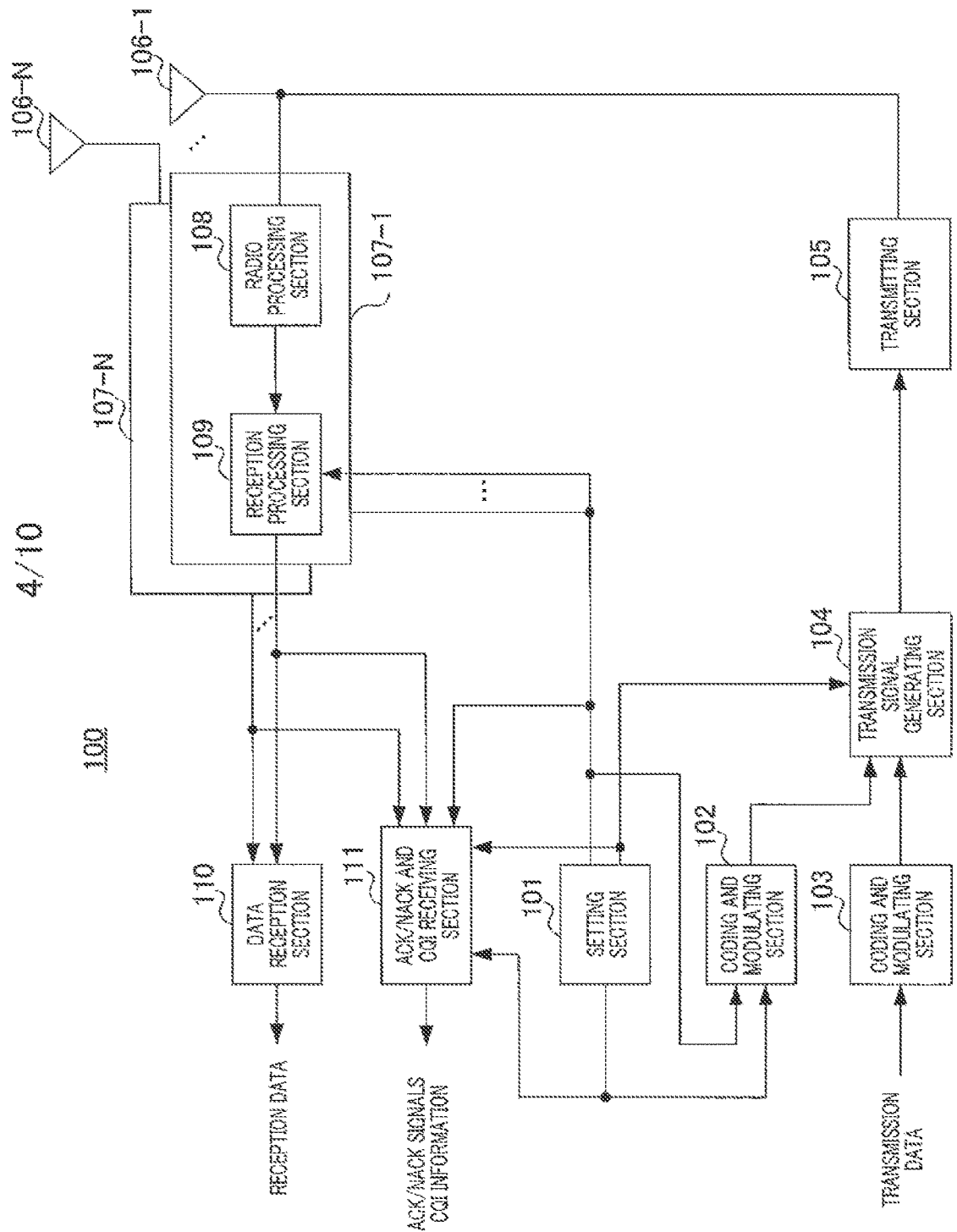
FIG. 4 is a block diagram showing the configuration of a base station according to Embodiment 1 of the present invention.

FIG. 4 is a block diagram showing the configuration of base station 100 according to this embodiment.

In base station 100 as shown in FIG. 4, setting section 101 sets control parameters related to resource allocation for control information (including at least ACK/NACK signals or CQIs) transmitted in an uplink data channel (PUSCH) used to communicate with a terminal for which the control parameters are set based on the transmitting and receiving capability of the terminal (i.e., UE capability) or the state of the transmission path. The control parameters include, for example, an amount of offset (for example, an amount of offset $\beta_{offset}^{PUSCH}$ as shown in equation 2) used in allocation of resource of control information transmitted by the terminal for which the control parameters are set. Setting section 101 outputs setting information including the control parameters to coding and modulating section 102 and ACK/NACK and CQI receiving section 111.

For terminals performing the non-MIMO transmission, setting section 101 generates MCS information for a single CW (or transport block) and allocation control information including resource (or resource block (RB)) allocation information, while for terminals performing SU-MIMO transmission, setting section 101 generates allocation control information including MCS information for the two CWs (or transport blocks), or the like.

The allocation control information generated by setting section 101 includes uplink allocation control information indicating uplink resource (for example, physical uplink shared channel (PUSCH)) to which uplink data of a terminal is assigned, and downlink allocation control information indicating downlink resource (for example, physical downlink shared channel (PDSCH)) to which downlink data addressed to a terminal is assigned. In addition, the downlink allocation control information includes information indicating the number of bits of ACK/NACK signals for the downlink data (i.e., ACK/NACK information). Setting section 101 outputs the uplink allocation control information to coding and modulating section 102, reception processing sections 109 in reception sections 107-1 to 107-N, and ACK/NACK and CQI receiving section 111 and outputs the downlink allocation control information to transmission signal generating section 104 and ACK/NACK and CQI receiving section 111.

Coding and modulating section 102 codes and modulates the set information and uplink allocation control information received from setting section 101, and then outputs the modulated signals to transmission signal generating section 104.

Coding and modulating section 103 codes and modulates transmission data to be received and then outputs the modulated data signals (for example, PDSCH signals) to transmission signal generating section 104.

Transmission signal generating section 104 allocates the signals received from coding and modulating section 102 and the data signals received from coding and modulating section 103 to a frequency resource to generate frequency domain signals based on the downlink allocation control information received from setting section 101. Transmission signal generating section 104 then converts the frequency domain signals into time-waveform signals using inverse fast Fourier transform (IFFT) processing, and adds a cyclic prefix (CP) to the time waveform signals, thereby obtaining orthogonal frequency division multiplexing (OFDM) signals.

Transmitting section 105 performs radio transmission processing (upconversion and digital-analogue (D/A) conversion and/or the like) on the OFDM signals received from transmission signal generating section 104, and then transmits the signals through antenna 106-1.

Reception sections 107-1 to 107-N are provided to antennas 106-1 to 106-N, respectively. Reception sections 107 include respective radio processing sections 108 and reception processing sections 109.

More specifically, radio processing sections 108 in respective reception sections 107-1 to 107-N receive radio signals through respective antennas 106, perform radio processing (downconversion and analog-digital (A/D) conversion and/or the like) on the received radio signals and then output the resulting reception signals to respective reception processing sections 109.

Reception processing sections 109 remove CP from the reception signals and perform fast Fourier transform (FFT) on the signals to convert the signals into frequency domain signals. Reception processing sections 109 extract uplink signals for each terminal (including data signals and control signals (i.e., ACK/NACK signal and CQI)) from the frequency domain signals based on the uplink allocation control information received from setting section 101. If the reception signals are space-division multiplexed (that is, a plurality of CWs are used (i.e., on the SU-MIMO transmission)), reception processing sections 109 separate and combine the CWs. Reception processing sections 109 then perform inverse discrete Fourier transform (IDFT) processing on the extracted (or extracted and separated) signals to convert the signals into time domain signals. Reception processing sections 109 output the time domain signals to data reception section 110 and ACK/NACK and CQI receiving section 111.

Data reception section 110 decodes the time domain signals received from reception processing sections 109 and then outputs the decoded uplink data as reception data.

ACK/NACK and CQI receiving section 111 calculates the amount of uplink resource to which ACK/NACK signals are assigned, based on the setting information (i.e., control parameters), the MCS information for uplink data signals (i.e., MCS information for each CW in the case of the SU-MIMO transmission), and the downlink allocation control information (for example, ACK/NACK information showing the number of bits of ACK/NACK signals for downlink data) received from setting section 101. For CQIs, ACK/NACK and CQI receiving section 111 further calculates an amount of uplink resource (e.g., PUSCH) to which the CQI is assigned, using information concerning the preset number of bits of a CQI. Based on the calculated amount of resource, ACK/NACK and CQI receiving section 111 then extracts ACK/NACKs or CQIs from each terminal for downlink data (PDSCH signals) from the channel (for example, PUSCH) to which uplink data signals have been assigned.

If the traffic state in cells covered by base station 100 remains unchanged or if the measurement of an average reception quality is needed, control parameters (for example, the amount of offset $\beta_{offset}^{PUSCH}$) to be notified by base station 100 to terminal 200 should preferably be transmitted in an upper layer at a long notification interval (RRC signaling) from a perspective of signaling. Transmitting all or part of these control parameters as broadcast information leads to a reduction in an amount of resource required for the notification. On the contrary, if control parameters need to be dynamically changed in response to the traffic state in cells covered by base station 100, all or part of these control parameters should preferably be notified in a PDCCH at a short notification interval.

(Terminal Configuration)

FIG. 12 is a block diagram showing the configuration of terminal 200 in accordance with Embodiment 1 of the present invention. Terminal 200 is an LTE-A terminal which receives data signals (downlink data) and transmits an ACK/NACK signal corresponding to the data signals through a physical uplink control channel (PUCCH) or PUSCH to base station 100. Terminal 200 transmits a CQI to base station 100 in accordance with instruction information notified through a physical downlink control channel (PDCCH).

Figure 5:
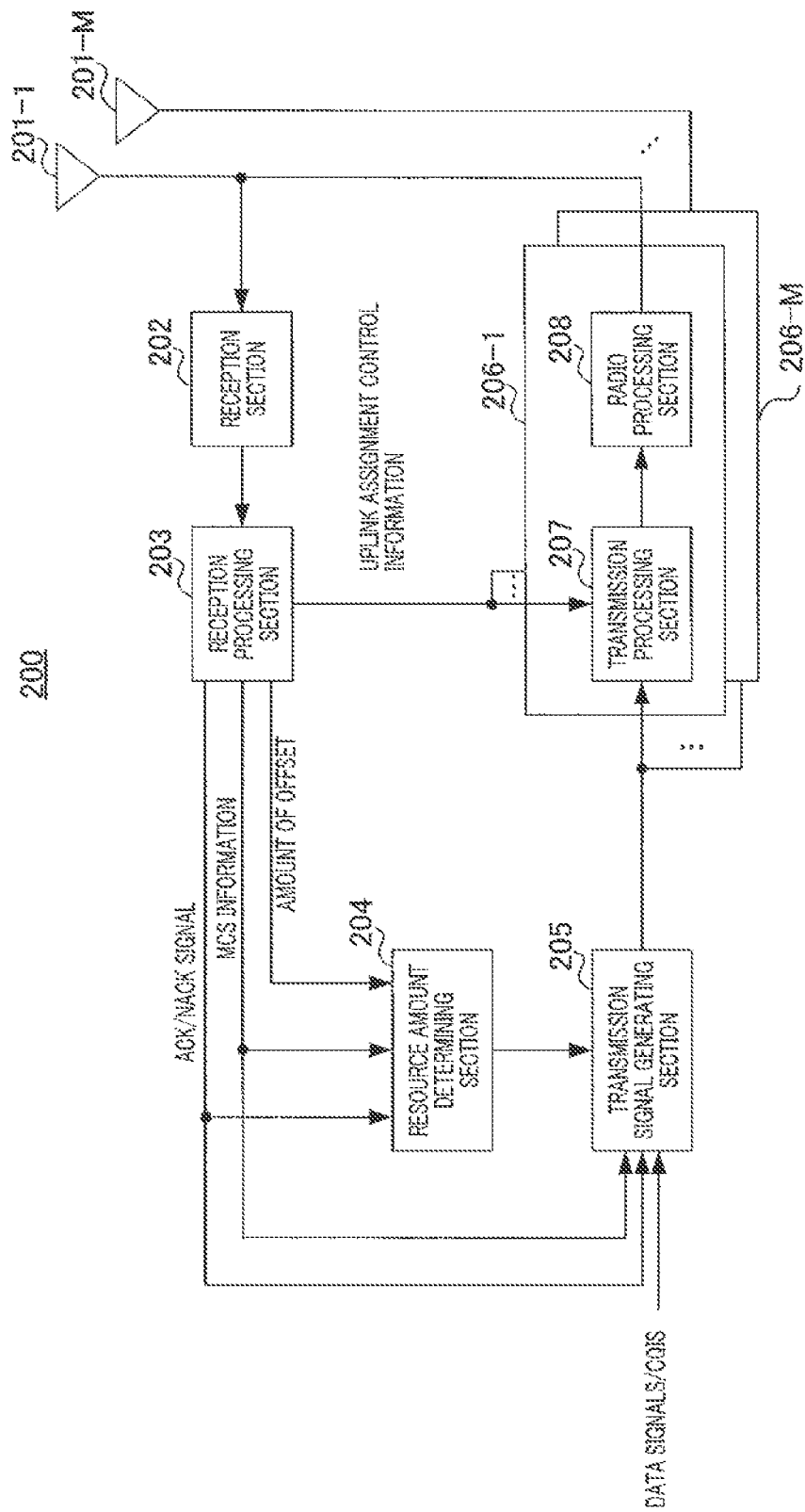
FIG. 5 is a block diagram showing the configuration of a terminal according to Embodiment 1 of the present invention.

In terminal 200 shown in FIG. 5, reception section 202 performs radio processing (down-conversion and analog-digital (A/D) conversion and/or the like) on radio signals received through antenna 201-1 (i.e., OFDM signals herein) and outputs the resulting reception signals to reception processing section 203. The reception signals include data signals (for example, PDSCH signals), allocation control information and upper layer control information including setting information.

Reception processing section 203 removes CP from the reception signals and performs fast Fourier transform (FFT) on the remaining signals to convert the signals into frequency domain signals. Reception processing section 203 then separates the frequency domain signals into upper layer control signals (for example, RRC signaling) including setting information, allocation control information, and data signals (i.e., PDSCH signals), and then demodulates and decodes the separated signals. Reception processing section 203 also checks the data signals for an error, and if the received data contains an error, a NACK signal is generated, and if not, it generates an ACK signal as the ACK/NACK signal. Reception processing section 203 outputs ACK/NACK signals and ACK/NACK information and MCS information in the allocation control information to resource amount determining section 204 and transmission signal generating section 205, and outputs setting information (for example, control parameters (an amount of offset)) to resource amount determining section 204, and outputs the uplink allocation control information in the allocation control information (for example, uplink resource allocation results) to transmission processing sections 207 in respective transmitting sections 206-1 to 206-M.

Resource amount determining section 204 determines the amount of resource required to allocate ACK/NACK signals, based on the ACK/NACK information (the number of bits of ACK/NACK signals), MCS information and control parameters (an amount of offset or the like) concerning resource allocation of control information (ACK/NACK signals) received from reception processing section 203. For CQIs, resource amount determining section 204 determines the amount of resource required to allocate CQIs, based on the MCS information and control parameters (an amount of offset or the like) concerning resource allocation of control information (CQIs) received from reception processing section 203, and the preset number of bits of a CQI. In the case of the SU-MIMO transmission, where the two CWs (CW#0 and CW#1) are transmitted in a plurality of layers, resource amount determining section 204 determines the amount of resource for each of the plurality of layers, the amount of the resource being allocated to control information (ACK/NACK signals) allocated in the two CWs (CW#0 and CW#1). More specifically, resource amount determining section 204 determines the amount of the resource based on either the lower coding rate of the coding rates of the two CWs or the average of the inverses of the coding rates of the two CWs. Details on methods for determining the amount of the resource required to allocate control information (ACK/NACKs or CQIs) in resource amount determining section 204 is given hereinafter. Resource amount determining section 204 outputs the determined amount of resource to transmission signal generating section 205.

Transmission signal generating section 205 generates a transmission signal by allocating an ACK/NACK signal (error detection result of downlink data), data signals (uplink data) and CQIs (downlink quality information) in CWs allocated to one or more layers based on the ACK/NACK information (the number of bits of an ACK/NACK signal) and MCS information received from reception processing section 203.

More specifically, transmission signal generating section 205 first modulates the ACK/NACK signal based on the amount of the resource (i.e., the amount of resource of the ACK/NACK signal) received from resource amount determining section 204. Transmission signal generating section 205 also modulates the CQI based on the amount of the resource (i.e., the amount of resource of the CQIs) received from resource amount determining section 204. Transmission signal generating section 205 modulates transmission data using the amount of the resource specified by using the amount of the resource (i.e., CQI resource amount) received from resource amount determining section 204 (the amount of the resource is specified by subtracting the amount of CQI resource from the amount of the resource for each slot).

In the case of non-MIMO transmission, transmission signal generating section 205 generates a transmission signal by allocating the ACK/NACK signal, data signals and CQI that have been modulated using the above-mentioned amount of resource in a single CW. Meanwhile, in the case of SU-MIMO transmission, transmission signal generating section 205 generates a transmission signal by allocating the ACK/NACK signal and data signals that have been modulated using the above-mentioned amount of resource in the two CWs and by allocating the CQI in one of the two CWs. Furthermore, in the case of non-MIMO transmission, transmission signal generating section 205 assigns a single CW to a single layer, and in the case of SU-MIMO transmission, transmission signal generating section 205 assigns the two CWs to a plurality of layers. For example, in the case of the SU-MIMO transmission, transmission signal generating section 205 assigns CW#0 to layer #0 and layer #1 and assigns CW#1 to layer #2 and layer #3.

In the presence of data signals and CQIs to be transmitted, transmission signal generating section 205 assigns the data signals and CQIs to an uplink data channel (PUSCH) by time multiplexing or frequency division multiplexing using a rate matching in one of the plurality of CWs as shown in FIG. 1. In the presence of data signals and ACK/NACK signals to be transmitted, transmission signal generating section 205 overwrites part of the data signals with ACK/NACK signals in all of the plurality of layers (i.e., puncturing). To put it differently, ACK/NACK signals are transmitted in all the layers. In the absence of data signals to be transmitted, transmission signal generating section 205 assigns CQIs and ACK/NACK signals to an uplink control channel (for example, PUCCH). Transmission signal generating section 205 then outputs the transmission signals thus generated (including ACK/NACK signals, data signals or CQIs) to transmitting sections 206-1 to 206-M.

Transmitting sections 206-1 to 206-M correspond to antennas 201-1 to 201-M, respectively. Transmitting sections 206 include respective transmission processing sections 207 and radio processing sections 208.

More specifically, transmission processing sections 207 in respective transmitting sections 206-1 to 206-M perform discrete Fourier transform (DFT) to the transmission signals received from transmission signal generating section 205 (i.e., signals corresponding to respective layers) to convert the data signals, ACK/NACK signals and CQIs into frequency domain signals. Transmission processing sections 207 then maps the plurality of frequency components obtained by the DFT processing (including ACK/NACK signals and CQIs transmitted on the PUSCH) to the uplink data channels (PUSCH) based on the uplink resource allocation information received from reception processing section 203. Transmission processing sections 207 convert the plurality of frequency components mapped to the PUSCH into time domain waveforms and add CP thereto.

Radio processing sections 208 perform radio processing (upconversion and digital-analog (D/A) conversion and/or the like) on the signals to which CP has been added, and then transmit the signals through respective antennas 201-1 to 201-M.

(Operations of Base Station 100 and Terminal 200)

The operations of base station 100 and terminal 200 having the above-mentioned configurations will be described below. In particular, the method used by resource amount determining section 204 of terminal 200 to determine the amount of the resource required to allocate control information (ACK/NACKs or CQIs) will be described in details. In the following description, the method for determining the amount of the resource in the SU-MIMO transmission, where a plurality of CWs to which control information is allocated are transmitted in a plurality of layers, will be described.

In the following description, terminal 200 (transmission signal generating section 205) allocates ACK/NACK signals, which are control information, in the two CWs (i.e., CW#0 and CW#1).

Determination Methods 1 to 5 for determining the amount of the resource of control information are described below.

<Determination Method 1>

In Determination Method 1, resource amount determining section 204 determines the amount of the resource required to allocate control information in each layer based on the lower coding rate of the coding rates of the two CWs to which control information is allocated. More specifically, resource amount determining section 204 determines the amount of the resource required to allocate control information in each layer $Q_{CW\#0+CW\#1}$ based on the lower coding rate of the coding rates of CW#0 and CW#1 (coding rate $r_{lowMCS}$) in accordance with equation 3.

(Equation 3)

$$Q_{CW\#0+CW\#1} = \left\lceil (O+P) \times \frac{1}{r_{lowMCS}} \times \beta_{offset}^{PUSCH} / L \right\rceil \quad [3]$$

With reference to equation 3, O indicates the number of bits in control information and P indicates the number of bits for error correction added to control information (for example, the number of bits in CRC and in some cases, P=0). L indicates the total number of layers (the total number of layers containing CWs).

Resource amount determining section 204, as shown in equation 3 and as in equation 1, determines the amount of the resource of control information in each layer by multiplying the inverse ($1/r_{lowMCS}$) of the coding rate $r_{lowMCS}$ by the amount of offset $\beta_{offset}^{PUSCH}$, and then dividing the result by the total number of layers L.

In this manner, the reception quality required by each CW can be ensured in all the layers. More specifically, in the layer containing CW#0 or CW#1 having the lower coding rate (i.e., CW with the coding rate $r_{lowMCS}$), the amount of resource $Q_{CW\#0+CW\#1}$ determined based on the coding rate $r_{lowMCS}$, that is, an appropriate amount of resource is used for transmission, thus ensuring the control information allocated in that CW meets the required reception quality. In the layer containing CW#0 or CW#1 having the higher coding rate, the amount of the resource $Q_{CW\#0+CW\#1}$ determined based on the coding rate $r_{lowMCS}$ (that is, the coding rate of the other CW) is used for transmission, but that amount is equal to or more than the appropriate amount of resource. Thus, the control information allocated in that CW can sufficiently meet the required reception quality.

As shown above, in accordance with Determination Method 1, resource amount determining section 204 uses a CW with the lower coding rate of the coding rates of the plurality of CWs to determine the amount of the resource of control information in each layer. In other words, resource amount determining section 204 uses a CW assigned to a layer in a poor transmission path environment among a plurality of CWs to determine the amount of the resource of control information in each layer, thus ensuring that required reception quality is sufficiently met in all the CWs, including the CW assigned to a layer in a poor transmission path environment. Thus, base station 100 can meet reception quality required by all the CWs (i.e., reception quality required by control information in an LTE system). Accordingly, by combining CW#0 and CW#1 into control information, base station 100 can ensure that the combined control information can meet the required reception quality, and prevent the degradation of reception quality of the control information.

<Determination Method 2>

In Determination Method 2, resource amount determining section 204 determines the amount of the resource of control information in each layer based on the average of the inverses of the coding rates of the two CWs. More specifically, resource amount determining section 204 determines the amount of the resource $Q_{CW\#0+CW\#1}$ of control information in each layer in accordance with equation 4 below.

(Equation 4)

$$Q_{CW\#0+CW\#1} = \left[ (O+P) \times \frac{\frac{1}{r_{CW\#0}} + \frac{1}{r_{CW\#1}}}{2} \times \beta_{offset}^{PUSCH} / L \right] \quad [4]$$

In equation 4, $r_{CW\#0}$ indicates the coding rate of CW#0 and $r_{CW\#1}$ indicates the coding rate of CW#1.

Resource amount determining section 204, as shown in equation 4 and as in equation 1, determines the amount of the resource of control information in each layer by multiplying an average of the inverse ($1/r_{CW\#0}$) of the coding rate $r_{CW\#0}$ and the inverse ($1/r_{CW\#1}$) of the coding rate $r_{CW\#1}$ by an amount of offset $\beta_{offset}^{PUSCH}$ and dividing the result by the total number of layers L.

One bit of the control information allocated in CW#0 is coded into ($1/r_{CW\#0}$) bit. Likewise, one bit of the control information allocated in CW#1 is coded into ($1/r_{CW\#1}$) bit. In other words, the average of the number of bits obtained by coding one bit of the control information in each CW (($1/r_{CW\#0}$)+($1/r_{CW\#1}$)/2) corresponds to the average of the number of bits appropriate for combining CW#0 and CW#1. Thus, the average of the inverses of the CW coding rates (($1/r_{CW\#0}$)+($1/r_{CW\#1}$)/2) equals the inverse of the coding rate of a combined CW obtained by combining CW#0 and CW#1.

In accordance with Determination Method 1 (equation 3), the amount of resource is determined based on the lower coding rate of the coding rates of the two CWs (i.e., CW#0 and CW#1). This means that an appropriate amount of resource is determined for the layer containing a CW with the lower coding rate among CW#0 and CW#1, while an amount of resource equal to or more than an appropriate amount of resource is determined for the layer containing the other CW (i.e., CW with the higher coding rate), which results in wasteful use of resource.

In contrast, in accordance with Determination Method 2, resource amount determining section 204 determines the amount of resource of control information in each layer based on the inverse of the coding rate of a combined CW obtained by combining CW#0 and CW#1 (the average of the inverses of the coding rates of CW#0 and CW#1).

an amount of resource smaller than that determined by Determination Method 1 for the layer containing a CW with a higher coding rate between CW#0 and CW#1 is determined. In other words, Determination Method 2 can reduce more wasteful use of resource than Determination Method 1 for a layer allocated to a CW with the higher coding rate. In contrast, an amount of resource less than an appropriate amount of resource is determined for a layer allocated to a CW having the lower coding rate. As described above, since resource amount determining section 204 determines the amount of the resource such that a combined CW obtained by combining all the CWs can meet required reception quality, base station 100 combines CW#0 and CW#1 and ensures that the combined control information can meet required reception quality.

As described above, in accordance with Determination Method 2, resource amount determining section 204 determines the amount of resource required to assign control information in each layer based on the average of the inverses of the coding rates of the plurality of CWs. This prevents the degradation of reception quality of control information while reducing wasteful use of resources.

<Determination Method 3>

In Determination Method 3, resource amount determining section 204 determines the amount of the resource of control information in each layer based on the inverse of the coding rate of one of the two CWs and a correction factor notified from base station 100. More specifically, resource amount determining section 204 determines the amount of the resource $Q_{CW\#0+CW\#1}$ of control information in each layer in accordance with equation 5 below.

(Equation 5)

$$Q_{CW\#0+CW\#1} = \left[ (O+P) \times \frac{1}{r_{CW\#0}} \times \beta_{offset}^{PUSCH} / \gamma_{offset} / L \right] \quad [5]$$

In equation 5, $r_{CW\#0}$ indicates the coding rate of CW#0 and $\gamma_{offset}$ indicates a correction factor notified from base station 100 as a control parameter.

Resource amount determining section 204, as shown in equation 5 and as in equation 1, determines the amount of the resource of control information in each layer by multiplying the inverse ($1/r_{CW\#0}$) of the coding rate $r_{CW\#0}$ by an amount of offset $\beta_{offset}^{PUSCH}$ further multiplying the resulting resource amount by a correction factor $\gamma_{offset}$, and dividing the result by the total number of layers L.

An exemplary correction factor $\gamma_{offset}$ notified from base station 100 is shown in FIG. 6. Base station 100 selects a correction factor $\gamma_{offset}$ based on a difference in coding rate between two CW#0 and CW#1 (difference in reception quality) or a coding rate ratio between CW#0 and CW#1 (ratio of reception quality).

More specifically, if the coding rate of a single CW (coding rate $r_{CW\#0}$ of CW#0 in this case) used to determine the amount of the resource of control information is lower than the coding rate of the other CW (coding rate $r_{CW\#1}$ of CW#1 in this case), base station 100 uses a correction factor $\gamma_{offset}$ of a value less than 1.0 (any of the correction factors for the signaling #A to #C shown in FIG. 6).

On the other hand, if the coding rate of a single CW (coding rate $r_{CW\#0}$ of CW#0 in this case) used to determine the amount of the resource of control information is higher than the coding rate of the other CW (coding rate $r_{CW\#1}$ of CW#1 in this case), base station 100 uses a correction factor $\gamma_{offset}$ exceeding 1.0 (one of correction factors for the signaling #E and #F shown in FIG. 6).

The smaller the difference in coding rate between the CWs (difference in reception quality) is, the closer to 1.0 the correction factor $\gamma_{offset}$ selected by base station 100 is (if there is no difference in coding rate between the CWs (i.e., the rates are identical), the correction factor for signaling #D shown in FIG. 6 (1.0) is selected).

Base station 100 notifies terminal 200 of setting information including control parameters including the selected correction factor $\gamma_{offset}$ (the signaling number of the correction factor $\gamma_{offset}$) via the upper layers.

As described above, resource amount determining section 204 uses a correction factor $\gamma_{offset}$ set in accordance with a difference in coding rate (a difference in reception quality) between the two CWs to correct the amount of the resource determined based on the coding rate (inverse) of one of the two CWs.

As shown above, determination of the amount of the resource based on the inverse of the lower coding rate of the coding rates of the two CWs (coding rate $r_{CW\#0}$ of CW#0 in this case) results in setting of an excess amount of resource for the other CW (CW#1 in this case), for example. To cope with this problem, resource amount determining section 204 can reduce the excess use of resource for the other CW (CW#1 in this case) by multiplying the amount of the resource determined based on the inverse of the lower coding rate by a correction factor $\gamma_{offset}$ of a value less than 1.0. Likewise, determination of the amount of the resource based on the inverse of the higher coding rate of the coding rates of the two CWs results in an insufficient amount of resource for the other CW. To address this problem, resource amount determining section 204 can increase the amount of the resource of the other CW by multiplying the amount of the resource determined based on the inverse of the higher coding rate by a correction factor $\gamma_{offset}$ of a value exceeding 1.0.

As described above, equation 5 corrects the amount of the resource determined based on the coding rate of one of CWs (coding rate $r_{CW\#0}$ of CW#0 in this case) with a correction factor $\gamma_{offset}$ set in accordance with a difference in coding rate between the two CWs, thereby allowing the calculation of the amount of the resource based on the two CWs (i.e., required reception quality of a combined CW obtained by combining the two CWs).

To put it differently, resource amount determining section 204 corrects the coding rate (inverse) of one of the two CWs in accordance with the difference in coding rate between the two CWs. More specifically, resource amount determining section 204 adjusts the corrected coding rate such that the coding rate is approximated to the average of the coding rates of the two CWs by adopting a larger correction factor ($\gamma_{offset}$) for the coding rate (i.e., inverse) of one of the two CWs in response to a larger difference in coding rate between the two CWs. Accordingly, the inverse of the corrected coding rate ($\gamma_{offset}/r_{CW\#0}$ in equation 5) corresponds to the average of the inverses of the coding rates of the two CWs (i.e., the value to which the corrected coding rate is approximated). Resource amount determining section 204 determines the amount of the resource of control information in each layer based on the average of the inverses of the coding rates of the two CWs (i.e., the inverse of the corrected coding rate ($\gamma_{offset}/r_{CW\#0}$ in equation 5).

As shown above, in accordance with Determination Method 3, resource amount determining section 204 determines the amount of the resource required to allocate control information in each layer based on the inverse of the coding rate of one CW and a correction factor set in accordance with a difference in coding rate between the two CWs. In this manner, the amount of the resource in consideration of both of the two CWs can be determined, which in turn, prevents the degradation in reception quality of control information while reducing wasteful use of resource.

In accordance with Determination Method 3, even in the case where the coding rate of one of the two CWs (coding rate $r_{CW\#0}$ of CW#0 in equation 5) is extremely low (for example, $r_{CW\#0}$ is infinitely close to 0), assignment of an excessive amount of resource to control information can be prevented by multiplying the amount of the resource calculated based on the coding rate $r_{CW\#0}$ by a correction factor $\gamma_{offset}$ set in accordance with a difference in coding rate between the two CWs. This means that the correction factor can prevent the assignment of an excessive assignment of resources.

If it is pre-determined that the lower coding rate of the coding rates of the two CWs is used to determine the amount of the resource $Q_{CW\#0+CW\#1}$, instead of the coding rate $r_{CW\#0}$ of CW#0 shown in equation 5, only correction factors $\gamma_{offset}$ of values equal to 1.0 or lower may be used as candidates. For example, among the candidates for correction factor $\gamma_{offset}$ in FIG. 6, only the correction factors $\gamma_{offset}$ for the signaling #A to #D may be set. This leads to a reduction in the amount of signaling used for notification of the correction factors $\gamma_{offset}$.

Likewise, if it is pre-determined that the higher coding rate of the coding rates of the two CWs is used to determine the amount of the resource $Q_{CW\#0+CW\#1}$, instead of the coding rate $r_{CW\#0}$ of CW#0 shown in equation 5, only correction factors $\gamma_{offset}$ of values equal to 1.0 or higher may be used as candidates. For example, among the candidates for correction factor $\gamma_{offset}$ in FIG. 6, only the correction factors $\gamma_{offset}$ for the signaling #D to #F may be set. This leads to a reduction in the amount of signaling used for notification of the correction factors $\gamma_{offset}$.

A plurality of correction factor $\gamma_{offset}$ candidate tables may be provided and switched depending on whether the coding rate $r_{CW\#0}$ of CW#0 in equation 5 is the lower or higher coding rate of the coding rates of two CWs. For example, if the coding rate $r_{CW\#0}$ of CW#0 in equation 5 is the lower coding rate of the coding rates of the two CWs, a candidate table containing the correction factors $\gamma_{offset}$ for the signaling #A to #D shown in FIG. 6 may be used. In contrast, if the coding rate $r_{CW\#0}$ of CW#0 in equation 5 is the higher coding rate of the coding rates of the two CWs, a candidate table containing correction factors $\gamma_{offset}$ for the signaling #D to #E shown in FIG. 6 may be used.

<Determination Method 4>

Determination Method 4 is identical to Determination Method 3 (equation 5) in that the amount of the resource of control information is calculated based on the coding rate (inverse) of one of the two CWs, except for the calculation method of the correction factor.

Hereinafter, Determination Method 4 is described in details.

Since the two CWs to which control information is allocated are combined at base station 100 as described above, focusing on "reception quality of one" of the two CWs, reception quality of ("reception quality of a combined CW"/"reception quality of one of the two CWs") fold is obtained after combining the two CWs. The "reception quality of a combined CW" is obtained when the two CWs are combined.

To maintain the reception quality required for the entire CWs, the correction factor for the amount of the resource of control information calculated based on the coding rate (inverse) of one of CWs may be set to ("reception quality of one of CWs"/"reception quality of a combined CW"). This ensures the reception quality necessary to maintain the reception quality required by each CW to which control information is allocated at a minimum amount of resource required after combination of the two CWs.

In general, the following relationship holds between the reception quality and the coding rate: The higher the reception quality of a signal is, the higher the coding rate of the signal is. Thus, ("coding rate of one of CWs"/"coding rate of a combined CW") can be substituted for ("reception quality of one of CWs"/"reception quality of a combined CW") as a correction factor. The "coding rate of a combined CW" is obtained by combining two CWs.

Resource amount determining section 204 uses equation 6 below to set a correction factor $\gamma_{offset}$ which is represented by ("coding rate of one of CWs ($r_{CW\#0}$)"/"coding rate of a combined CW ($r_{CW\#0+CW\#1}$)"). In equation 6, the coding rate $r_{CW\#0}$ of CW#0 of the CW#0 and CW#1 is used as the "coding rate of one of CWs".

[6]

$$\gamma_{offset} = \frac{\text{coding rate of one of } CWs(r_{CW\#0})}{\text{coding rate of a combined } CW(r_{CW\#0+CW\#1})} = \text{(Equation 6)}$$

$$r_{CW\#0} \times \frac{M_{CW\#0sc}^{PUSCH-initial} \cdot N_{CW\#0symb}^{PUSCH-initial} + M_{CW\#1sc}^{PUSCH-initial} \cdot N_{CW\#1symb}^{PUSCH-initial}}{\sum_{r=0}^{C_{CW\#0}-1} K_r^{CW\#0} + \sum_{r=0}^{C_{CW\#1}-1} K_r^{CW\#1}}$$

In equation 6, $M_{CW\#0SC}^{PUSCH-initial}$ indicates a PUSCH transmission bandwidth for CW#0, $M_{CW\#1SC}^{PUSCH-initial}$ indicates a PUSCH transmission bandwidth for CW#1, $N_{CW\#0Symb}^{PUSCH-initial}$ indicates the number of transmission symbols in PUSCH per unit transmission bandwidth for CW#0, and $N_{CW\#1Symb}^{PUSCH-initial}$ indicates the number of transmission symbols in PUSCH per unit transmission bandwidth for CW#1. $C_{CW\#0}$ indicates the number of code blocks into which a data signal allocated in CW#0 is divided, $C_{CW\#1}$ indicates the number of code blocks into which a data signal allocated in CW#1 is divided, $K_r^{CW\#0}$ indicates the number of bits in each code block in CW#0 and $K_r^{CW\#1}$ indicates the number of bits in each code block in CW#1. For example, if CW#0 is assigned to two layers and assigned to 12 transmission symbols and has 12 sub-carriers in each layer, the amount of the resource of CW#0 ($M_{CW\#0SC}^{PUSCH-initial} \cdot N_{CW\#0Symb}^{PUSCH-initial}$) is 288 (RE). To be more precise, the $M_{CW\#0SC}^{PUSCH-initial}$ equals 12 sub-carriers, and the $N_{CW\#0Symb}^{PUSCH-initial}$ equals 24 transmission symbols (two layers each have 12 transmission symbols); thus, the amount of the resource of CW#0 ($M_{CW\#0SC}^{PUSCH-initial} \cdot N_{CW\#0Symb}^{PUSCH-initial}$) is 288 (=12×24). Note that $M_{CW\#0SC}^{PUSCH-initial}$, $M_{CW\#1SC}^{PUSCH-initial}$, $N_{CW\#0Symb}^{PUSCH-initial}$ and $N_{CW\#1Symb}^{PUSCH-initial}$ represent values at initial transmission.

($M_{CW\#0SC}^{PUSCH-initial} \cdot N_{CW\#0Symb}^{PUSCH-initial}$ + $M_{CW\#1SC}^{PUSCH-initial} \cdot N_{CW\#1Symb}^{PUSCH-initial}$) shown in equation 6 indicates the total amount of transmission resources of respective data signals in CW#0 and CW#1, and ($\Sigma K_r^{CW\#0} + \Sigma K_r^{CW\#1}$) indicates the total number of transmission symbols in a PUSCH (or the total number of bits in CW#0 and CW#1) to which respective data signals in CW#0 and CW#1 (all code blocks) are assigned. Accordingly, ($M_{CW\#0SC}^{PUSCH-initial} \cdot N_{CW\#0Symb}^{PUSCH-initial}$ + $M_{CW\#1SC}^{PUSCH-initial} \cdot N_{CW\#1Symb}^{PUSCH-initial}$)/($\Sigma K_r^{CW\#0}$ + $\Sigma K_r^{CW\#1}$) shown in equation 6 indicates the inverse of the coding rate of a combined CW (1/(coding rate of a combined CW ($r_{CW\#0+CW\#1}$))).

Resource amount determining section 204 assigns the correction factor $\gamma_{offset}$ shown in equation 6 to, for example, equation 5. Resource amount determining section 204 determines the amount of the resource of control information $Q_{CW\#0+CW\#1}$ in each layer in accordance with equation 7 below:

[7]

$$Q_{CW\#0+CW\#1} = \qquad \text{(Equation 7)}$$

$$\left[ (O+P) \cdot \frac{M_{CW\#0sc}^{PUSCH-initial} \cdot N_{CW\#0symb}^{PUSCH-initial} + M_{CW\#1sc}^{PUSCH-initial} \cdot N_{CW\#1symb}^{PUSCH-initial}}{\sum_{r=0}^{C_{CW\#0}-1} K_r^{CW\#0} + \sum_{r=0}^{C_{CW\#1}-1} K_r^{CW\#1}} \cdot \beta_{offset}^{PUSCH} / L \right]$$

Resource amount determining section 204, as shown in equation 7 and as in equation 1, determines the amount of the resource of control information in each layer by multiplying the inverse ($1/r_{CW\#0}$) of the coding rate $r_{CW\#0}$ by an amount of offset $\beta_{offset}^{PUSCH}$ to obtain an amount of resource, multiplying the resulting amount of resource by a correction factor $\gamma_{offset}$, and then dividing the result by the total number of layers L.

the result obtained by multiplying the inverse ($1/r_{CW\#0}$) of the "coding rate of one of CWs ($r_{CW\#0}$)" in equation 5 by a correction factor $\gamma_{offset}$ shown in equation 6 ("coding rate of one of CWs ($r_{CW\#0}$)"/"coding rate of a combined CW ($r_{CW\#0+CW\#1}$)") is equivalent to the inverse of the coding rate of a CW obtained by combining CW#0 and CW#1 (1/(coding rate of a combined CW ($r_{CW\#0\ CW\#1}$))). In other words, the inverse of the coding rate of a combined CW (1/(coding rate of a combined CW ($r_{CW\#0+CW\#1}$))), that is, the average of the inverses of the coding rates of the two CWs can be obtained by correcting the inverse of the coding rate of one of the two CWs ($1/r_{CW\#0}$) with a correction factor $\gamma_{offset}$ (equation 6). Accordingly, resource amount determining section 204 uses the inverse of the coding rate of a combined CW as the average of the inverses of the coding rates of the two CWs to determine the amount of the resource of control information in each layer.

As shown above, in Determination Method 4, resource amount determining section 204 determines the amount of the resource required to allocate control information in each layer based on the inverse of the coding rate of one of CWs, and the correction factor calculated based on the ratio of reception quality (i.e., the ratio of coding rates) between the two CWs. In other words, resource amount determining section 204 uses the ratio between the coding rate (reception quality) of one of CWs and the coding rate (reception quality) of a combined CW obtained by combining the two CWs, that is, the ratio of coding rates (i.e., ratio of reception quality) between the two CWs as a correction factor. This allows resource amount determining section 204 to obtain the reception quality necessary to maintain the reception quality required by each CW to which control information is allocated at a minimum amount of resource required. As shown above, Determination Method 4 can determine the amount of the resource in consideration of both the two CWs, thus preventing the degradation of reception quality of control information without wasteful use of resource.

Furthermore, Determination Method 4 allows terminal 200 to calculate a correction factor based on the coding rates (reception quality) of the two CWs, thus eliminating the need for base station 100 to notify terminal 200 of a correction factor, unlike in Determination Method 3. More specifically, Determination Method 4 can reduce the amount of signaling from base station 100 to terminal 200, as compared with Determination Method 3.

In Determination Method 4, the denominator of the correction factor $\gamma_{offset}$ shown in equation 6 indicates the total number of bits in CW#0 and CW#1. Accordingly, even if the coding rate of either CW#0 or CW#1 is extremely low (data size is extremely small), the correction factor $\gamma_{offset}$ is determined, taking the coding rate of the other CW into account, thereby preventing assignment of an excess amount of resource to the control information.

<Determination Method 5>

If the same control information is transmitted in a plurality of layers at the same time and at the same frequency, that is, if a rank-1 transmission is performed, the amount of the resource allocated to control information transmitted in each of a plurality of layers is equal.

In such a case, resource amount determining section 204 should preferably determine the amount of the resource of control information in each layer based on the number of bits that can be transmitted in the same amount of resource (for example, a certain number of REs (for example, a single RE)) in each layer.

More specifically, the coding rate $r_{CW\#0}$ of CW#0 indicates the number of bits in CW#0 that can be transmitted using a single RE, and the coding rate $r_{CW\#1}$ of CW#1 indicates the number of bits in CW#1 that can be transmitted using a single RE. Assuming that the number of layers in which CW#0 is allocated is indicated by $L_{CW\#0}$ and the number of layers in which CW#1 is allocated is indicated by $L_{CW\#1}$, and the number of bits $W_{RE}$ that can be transmitted using a single RE in all the layers (($L_{CW\#0}+L_{CW\#1}$) layers) is obtained from equation 8:

[8]

$$W_{RE}=r_{CW\#0} \times L_{CW\#0}+r_{CW\#1} \times L_{CW\#1} \quad \text{(Equation 8)}$$

To put it more specifically, this equation indicates that each layer can transmit ($W_{RE}/(L_{CW\#0}+L_{CW\#1})$) bits of data signal using a single RE on average. Namely, ($W_{RE}/(L_{CW\#0}+L_{CW\#1})$) may be used as the average of coding rates (i.e., the number of bits that can be transmitted using a single RE) of a CW allocated to each layer. This achieves reception quality necessary to maintain the reception quality required by each CW to which the control information is allocated at a minimum amount of resource required after combination of the two CWs transmitted in a plurality of layers.

Resource amount determining section 204, in accordance with equation 9 below, determines the amount of the resource of control information $Q_{CW\#0+CW\#1}$ in each layer based on the inverse of the average of the coding rates of the CWs assigned to each layer (($r_{CW\#0} \times L_{CW\#0}+r_{CW\#1} \times L_{CW\#1}$)/($L_{CW\#0}+L_{CW\#1}$)).

[9]

$$Q_{CW\#0+CW\#1} = \left\lceil (O+P) \cdot \frac{L_{CW\#0} + L_{CW\#1}}{r_{CW\#0} \times L_{CW\#0} + r_{CW\#1} \times L_{CW\#1}} \cdot \beta_{offset}^{PUSCH} / L \right\rceil \quad \text{(Equation 9)}$$

Resource amount determining section 204, as shown in equation 9 and as in equation 1, determines the amount of the resource of control information in each layer by multiplying the inverse of the average of the coding rates of the CWs assigned to each layer (($L_{CW\#0}+L_{CW\#1}$)/($r_{CW\#0} \times L_{CW\#0}+r_{CW\#1} \times L_{CW\#1}$)) by the amount of offset $\beta_{offset}^{PUSCH}$ and then dividing the result by the total number of layers L.

The average of the coding rates of the CWs assigned to each layer (($r_{CW\#0} \times L_{CW\#0}+r_{CW\#1} \times L_{CW\#1}$)/($L_{CW\#0}+L_{CW\#1}$)), as shown in equation 9, can be represented by $r_{CW\#0} \times (L_{CW\#0}/(L_{CW\#0}+L_{CW\#1}))+r_{CW\#1} \times (L_{CW\#1}/(L_{CW\#0}+L_{CW\#1}))$. This indicates that the coding rate $r_{CW\#0}$ of CW#0 is weighted by the proportion of the number of layers to which CW#0 is assigned ($L_{CW\#0}$) in all the number of layers ($L_{CW\#0}+L_{CW\#1}$), and that the coding rate $r_{CW\#1}$ of CW#1 is weighted by the proportion of the number of layers to which CW#1 is assigned ($L_{CW\#1}$) in all the number of layers ($L_{CW\#0}+L_{CW\#1}$).

In other words, resource amount determining section 204 weights the coding rate of each CW by the proportion of the number of layers to which the CW is assigned in all the layers to which a plurality of CWs are assigned. To be more precise, the greater the proportion of the number of layers to which a CW is assigned in all the layers to which a plurality of CWs are assigned is, the greater the weight given to the coding rate of the CW is. For example, in Determination Method 2 (equation 4), the average of the coding rates of the two CWs is simply calculated, and the number of layers to which each CW is assigned is not taken into account. In contrast, in Determination Method 5 (equation 9), the average of the coding rates of a CW in all the layers containing the CW can be calculated accurately.

As shown above, in accordance with Determination Method 5, resource amount determining section 204 determines the amount of the resource of control information in each layer using the average of the numbers of bits that can be transmitted in the same amount of resource (for example, a single RE) in each layer as the average of the coding rates of the CWs allocated to each layer. In this manner, the amount of the resource in consideration of the two CWs assigned to a plurality of layers can be determined. Thus, the degradation of reception quality of control information can be prevented without wasteful use of resource.

Since the rank-1 transmission is used for control information, the amount of resource is identical for each layer. In contrast, a transmission mode other than the rank-1 transmission may be used for data signals, in which case the amount of the resource varies depending on layers. In such a case, the same amount of resource is assumed for each layer and the average number of transmittable bits is calculated, as shown in Determination Method 5, which allows calculation of an appropriate amount of resource. In other words, Determination Method 5 is applicable to data signals with different transmission bandwidths. Suppose, for example, that, on initial transmission (i.e., in sub-frame 0), CW#0 is responded with ACK and CW#1 is responded with NACK, and on retransmission (i.e., in sub-frame 8), a new packet is assigned for CW#0 and a retransmission packet is assigned for CW#1. In this case, there may be a case where the transmission bandwidth differs between the new packet and the retransmission packet in sub-frame 8. In this case, the amount of the resource of control information is calculated by assigning the information on CW#0 that is transmitted initially in sub-frame 8 as CW#0 information, and the information on CW#1 that was transmitted initially in sub-frame 0 in equation 9 as CW#1 information. This method allows calculations of the amount of the resource, assuming that each layer uses the same amount of resource to transmit control information, and is effective when the same control information in a plurality of layers is transmitted at the same time and at the same frequency, that is, when rank-1 transmission is performed.

Furthermore, Determination Method 5 allows terminal 200 to calculate the correction factor based on the coding rates (reception quality) of the two CWs, thereby eliminating the need for base station 100 to notify terminal 200 of the correction factor, unlike in Determination Method 3. Accordingly, Determination Method 5 can reduce the amount of signaling from base station 100 to terminal 200, as compared with Determination Method 3.

In Determination Method 5, the denominator of the portion corresponding to the inverse of the coding rates in equation 9 (($L_{CW\#0}$ $L_{CW\#1}$) ($r_{CW\#0} \times L_{CW\#0}$ $r_{CW\#1} \times L_{CW\#1}$)) indicates the total number of bits transmittable using a single RE in all the layers to which CW#0 and CW#1 are assigned. This can prevent assignment of an excess amount of resource to control information since the coding rate of the other CW is taken into account, even if either CW#0 or CW#1 has an extremely lower coding rate (extremely small data size).

Assuming that the same amount of resource is assigned to layers to each of which a CW is assigned, the following equations are obtained: $M_{CW\#0SC}^{PUSCH\text{-}initial}$.

$N_{CW\#0Symb}^{PUSCH\text{-}initial} = M_{SC}^{PUSCH\text{-}initial}$ (0).
$N_{Symb}^{PUSCH\text{-}initial}$ (0)$\cdot L_{CW\#0}$ and $M_{CW\#1SC}^{PUSCH\text{-}initial}$.
$N_{CW\#1Symb}^{PUSCH\text{-}initial} = M_{SC}^{PUSCH\text{-}initial}$(1).
$N_{Symb}^{PUSCH\text{-}initial}$(1)$\cdot L_{CW\#1}$. The $M_{SC}^{PUSCH\text{-}initial}$ (0).
$N_{Symb}^{PUSCH\text{-}initial}$ (0) indicates an amount of the resource of data signals on initial transmission for each of layers to which CW#0 is assigned, and the $M_{SC}^{PUSCH\text{-}initial}$ (1).
$N_{Symb}^{PUSCH\text{-}initial}$ (1) indicates an amount of the resource of data signals on initial transmission for each of layers to which CW#1 is assigned. Equation 9 can be simplified to equation 10 using the abovementioned equations. Since $L_{CW\#0} + L_{CW\#1} = L$, equation 10 is equivalent to equation 11.

[10]

$$Q_{CW\#0+CW\#1} = \qquad (\text{Equation 10})$$

$$\left[ (O+P) \cdot \frac{L_{CW\#0} + L_{CW\#1}}{\frac{\sum_{r=0}^{C_{CW\#0}-1} K_r^{CW\#0}}{M_{CW\#0sc}^{PUSCH-initial} \cdot N_{CW\#0symb}^{PUSCH-initial}} \times L_{CW\#0} + \frac{\sum_{r=0}^{C_{CW\#1}-1} K_r^{CW\#1}}{M_{CW\#1sc}^{PUSCH-initial} \cdot N_{CW\#1symb}^{PUSCH-initial}} \times L_{CW\#1}} \right.$$

$$\left. \beta_{offset}^{PUSCH} / L \right] = \left[ (O+P) \cdot \right.$$

$$\left. \frac{L_{CW\#0} + L_{CW\#1}}{\frac{\sum_{r=0}^{C_{CW\#0}-1} K_r^{CW\#0}}{M_{sc}^{PUSCH-initial(0)} \cdot N_{symb}^{PUSCH-initial(0)}} + \frac{\sum_{r=0}^{C_{CW\#1}-1} K_r^{CW\#1}}{M_{sc}^{PUSCH-initial(1)} \cdot N_{symb}^{PUSCH-initial(1)}}} \cdot \beta_{offset}^{PUSCH}/L \right]$$

[11]

$$Q_{CW\#0+CW\#1} = \qquad (\text{Equation 11})$$

$$\left[ (O+P) \cdot \frac{1}{\frac{\sum_{r=0}^{C_{CW\#0}-1} K_r^{CW\#0}}{M_{sc}^{PUSCH-initial(0)} \cdot N_{symb}^{PUSCH-initial(0)}} + \frac{\sum_{r=0}^{C_{CW\#1}-1} K_r^{CW\#1}}{M_{sc}^{PUSCH-initial(1)} \cdot N_{symb}^{PUSCH-initial(1)}}} \cdot \beta_{offset}^{PUSCH} \right]$$

Assuming that the same amount of resource is assigned to each of layers to which a CW is assigned ($W_{layer} = M_{SC}^{PUSCH\text{-}initial} \cdot N_{Symb}^{PUSCH\text{-}initial}$), equation 9 can be simplified to equation 12.

[12]

$$Q_{CW\#0+CW\#1} = \qquad \text{(Equation 12)}$$

$$\left[ (O+P) \cdot \frac{L_{CW\#0} + L_{CW\#1}}{\frac{\sum_{r=0}^{C_{CW\#0}-1} K_r^{CW\#0}}{M_{CW\#0sc}^{PUSCH-initial} \cdot N_{CW\#0symb}^{PUSCH-initial}} \times L_{CW\#0} + \frac{\sum_{r=0}^{C_{CW\#1}-1} K_r^{CW\#1}}{M_{CW\#1sc}^{PUSCH-initial} \cdot N_{CW\#1symb}^{PUSCH-initial}} \times L_{CW\#1}} \right.$$

$$\left. \beta_{offset}^{PUSCH}/L \right] =$$

$$\left[ (O+P) \cdot \frac{L_{CW\#0} + L_{CW\#1}}{\frac{\sum_{r=0}^{C_{CW\#0}-1} K_r^{CW\#0}}{L_{CW\#0} \times W_{layer}} \times L_{CW\#0} + \frac{\sum_{r=0}^{C_{CW\#1}-1} K_r^{CW\#1}}{L_{CW\#1} \times W_{layer}} \times L_{CW\#1}} \cdot \beta_{offset}^{PUSCH}/L \right] =$$

$$\left[ (O+P) \cdot \frac{L_{CW\#0} + L_{CW\#1}}{\frac{\sum_{r=0}^{C_{CW\#0}-1} K_r^{CW\#0}}{W_{layer}} + \frac{\sum_{r=0}^{C_{CW\#1}-1} K_r^{CW\#1}}{W_{layer}}} \cdot \right.$$

$$\left. \beta_{offset}^{PUSCH}/L \right] = \left[ (O+P) \cdot \frac{(L_{CW\#0} + L_{CW\#1}) \times W_{layer}}{\sum_{r=0}^{C_{CW\#0}-1} K_r^{CW\#0} + \sum_{r=0}^{C_{CW\#1}-1} K_r^{CW\#1}} \cdot \beta_{offset}^{PUSCH}/L \right]$$

$((L_{CW\#0}+L_{CW\#1}) \times W_{layer})$ in equation 12 is equivalent to equation 13 below:

$$M_{CW\#0sc}^{PUSCH-initial} \cdot N_{CW\#0symb}^{PUSCH-initial} + M_{CW\#1sc}^{PUSCH-initial} \cdot N_{CW\#1symb}^{PUSCH-initial} \qquad [13]$$

Since $W_{layer} = M_{SC}^{PUSCH-initial} \cdot N_{Symb}^{PUSCH-initial}$ and $L_{CW\#0}+L_{CW\#1}=L$, equation 10 can be simplified to equation 14 below:

[14]

$$Q_{CW\#0+CW\#1} = \qquad \text{(Equation 14)}$$

$$\left[ (O+P) \cdot \frac{M_{SC}^{PUSCH-initial} \cdot N_{symb}^{PUSCH-initial}}{\sum_{r=0}^{C_{CW\#0}-1} K_r^{CW\#0} + \sum_{r=0}^{C_{CW\#1}-1} K_r^{CW\#1}} \cdot \beta_{offset}^{PUSCH} \right]$$

Determination Methods 1 to 5 for determining the amount of the resource of control information have been described.

ACK/NACK and CQI receiving section 111 of base station 100 determines the amount of the resource of control information (ACK/NACK signals or CQIs) in a reception signal using a method similar to Determination Methods 1 to 5 used in resource amount determining section 204. Based on the determined amount of the resource, ACK/NACK and CQI receiving section 111 extracts an ACK/NACK or CQI to downlink data (PDSCH signals) sent by each terminal from a channel (for example, PUSCH) to which uplink data signals have been assigned.

As shown above, this embodiment can prevent the degradation in reception quality of control information even in the case of adopting the SU-MIMO transmission method.

Embodiment 2

In Embodiment 1, the amount of the resource of control information is determined based on the lower coding rate of the coding rates of the two CWs (code words) or the average of the inverses of the coding rates of the two CWs. Meanwhile, in Embodiment 2, besides the processing in Embodiment 1, the amount of the resource of control information is determined in consideration of a difference in interference between layers for data signals and for control information.

Since the basic configurations of the base station and the terminal in accordance with Embodiment 2 are the same as those in Embodiment 1, FIGS. 4 and 5 are used to describe Embodiment 2.

Besides the processing similar to that of Embodiment 1, setting section 101 (FIG. 4) in base station 100 in accordance with Embodiment 2 sets a correction factor ($\alpha_{offset}$ (L)).

Besides the processing similar to that of Embodiment 1, ACK/NACK and CQI receiving section 111 determines the amount of the resource using the correction factor ($\alpha_{offset}$ (L)) received from setting section 101

Meanwhile, resource amount determining section 204 in terminal 200 according to Embodiment 2 (FIG. 5) uses a correction factor ($\alpha_{offset}$ (L)) notified from base station 100 to determine the amount of the resource.

(Operations of Base Station 100 and Terminal 200)

The operations of base station 100 and terminal 200 having the above-mentioned configurations will be described below:

<Determination Method 6>

If the number of layers or the number of ranks for control information equals the number of layers or the number of ranks for data signals, the same inter-layer interference occurs between data signals and control information. For example, if spatial multiplexing is performed with CW#0 to which control information is allocated and which is assigned to layer #0 and CW#1 containing data signals assigned to layer #1, a rank-2 transmission is performed for data signals and for control information, causing inter-layer interference of the same level.

Alternatively, if the number of ranks differs between control information and data signals, different inter-layer interference occurs between data signals and control information. If the same control information is allocated in CW#0 and CW#1 and transmitted in layer #0 and layer #1, that is, if a rank-1 transmission is performed, less inter-layer interference occurs, as compared with when different signals are allocated in CW#0 and CW#1 and transmitted in layer #0 and layer #1.

In this respect, resource amount determining section 204 increases or decreases the amount of the resource calculated with an above equation (for example, equation 1), depending on the number of ranks or the number of layers for data signals and for control information.

More specifically, resource amount determining section 204, as shown in equation 15 below, calculates the amount of the resource $Q_{CW\#0+CW\#1}$ by determining the amount of the resource of control information in each layer based on the coding rate of one of CWs (CW#0 or CW#1) or the coding rates of both CWs using the above equation 1, multiplying the determined amount of the resource by a correction factor $\alpha_{offset}$ (L) which depends on the number of ranks or the number of layers, and then dividing the result of multiplication by the total number of layers L.

[15]

$$Q_{CW\#0+CW\#1} = \left\lceil (O+P) \times \frac{1}{r_{CW\#0}} \times \beta_{offset}^{PUSCH} / L \times \alpha_{offset}(L) \right\rceil \quad \text{(Equation 15)}$$

In equation 15, $\alpha_{offset}$ (L) represents a correction factor that depends on the number of layers or the number of ranks for data signals and for control information.

For example, if the number of ranks or the number of layers for data signals is larger than that of control information, the correction factor $\alpha_{offset}$ (L), as shown in FIG. 7, implicitly decrease as a difference in the number of ranks or the number of layers between data signals and control information increases. As the difference in the number of ranks or the number of layers between data signals and control information decreases, the correction factor is approximated to 1.0.

Alternatively, if the number of ranks or the number of layers for data signals is smaller than that for control information, the correction factor $\alpha_{offset}$ (L), as shown in FIG. 8, implicitly increases as a difference in the number of ranks or the number of layers between data signals and control information increases.

The inter-layer interference is dependent on channel variations (or channel matrix): thus, inter-layer interference varies even if the number of ranks or the number of layers is identical, which means an appropriate correction is difficult using one set value. To cope with this problem, a plurality of correction factors $\alpha_{offset}$ shared between base station 100 and terminal 200 are provided in each layer to allow base station 100 to select one from the correction factors and notify terminal 200 via upper layers or PDCCH. Terminal 200 receives the correction factor $\alpha_{offset}$ from base station 100 and uses it to calculate the amount of the resource, as in Determination Method 6. Base station 100 may report the amount of offset $\beta_{offset}^{PUSCH}$ for each layer (or each rank).

the amount of the resource can be set in consideration of a difference in inter-layer interference between data signals and control information. Thus, the degradation of reception quality of control information can be prevented, while wasteful use of resource can be reduced.

Since inter-layer interference is dependent on channel variations (or channel matrix), upper layers cannot change channels frequently. To cope with frequently-occurring channel variations, the presence or absence of a correction factor may be reported using one bit in a physical downlink control channel (PDCCH) message having a shorter notification interval than upper layers. The PDCCH message is conveyed in each sub-frame, thereby facilitating flexible switching. Furthermore, use of one bit in the PDCCH to direct switching between use or non-use of the correction factor leads to a reduction in the amount of signaling.

The above-mentioned correction factor has a variable set value, depending on the control information (ACK/NACK signals and CQIs and/or the like), but a common notification (notification using a common set value) may be used for the control information (ACK/NACK signals and CQIs and/or the like). For example, if a set value 1 is conveyed to a terminal, the terminal selects a correction factor for ACK/NACK signals that corresponds to the set value 1 and a correction factor for CQIs that corresponds to the set value 1. This allows notification using a single set value for a plurality of parts of control information, thereby reducing the amount of signaling for notification of a correction factor.

this embodiment, the correction factor is increased or decreased, depending on the number of ranks or the number of layers for data signals and for control information, but since the number of layers and the number of ranks are closely related with CWs, the correction factor may be increased or decreased, depending on the number of CWs containing data signals and control information. Furthermore, the correction factor may be changed, depending on whether the number of ranks, the number of layers or the number of CWs for data signals and for control information is equal to or exceeds 1.

Embodiment 3

Embodiment 1 assumes that the number of layers is identical between initial transmission and retransmission. In contrast, in Embodiment 3, the amount of the resource of control information is determined in consideration of a difference in the number of layers between initial transmission and retransmission in the processing shown in Embodiment 1.

Since the basic configurations of the base station and the terminal according to Embodiment 3 is the same as those of Embodiment 1, FIGS. 4 and 5 are used to describe Embodiment 3.

ACK/NACK and CQI receiving section 111 in base station 100 according to Embodiment 3 (FIG. 4) performs processing similar to that of Embodiment 1 and calculates the amount of the resource required to allocate control information based on the number of layers on initial transmission and on retransmission. ACK/NACK and CQI receiving section 111 in Embodiment 3 differs from that in Embodiment 1 in that the equation to calculate the amount of the resource of control information is expanded.

Meanwhile, resource amount determining section 204 in terminal 200 according to Embodiment 3 (FIG. 5) performs processing similar to that of Embodiment 1 and calculates the amount of the resource required to allocate control information based on the number of layers on initial transmission and retransmission. Resource amount determining section 204 in Embodiment 3 differs from that in Embodiment 1 in that the equation to calculate the amount of the resource of control information is expanded.

(Operations of Base Station 100 and Terminal 200)

The operations of base station 100 and terminal 200 having the above-mentioned configurations will be described.

<Determination Method 7>

Determination Methods 1 to 6 assume that the number of layers is identical between initial transmission and retransmission. On initial transmission, the reception quality that is equal to or greater than a certain level (required reception quality) can be achieved for control information by setting the amount of the resource of control information using, for example, equation 9 (Determination Method 5).

Figure 9:
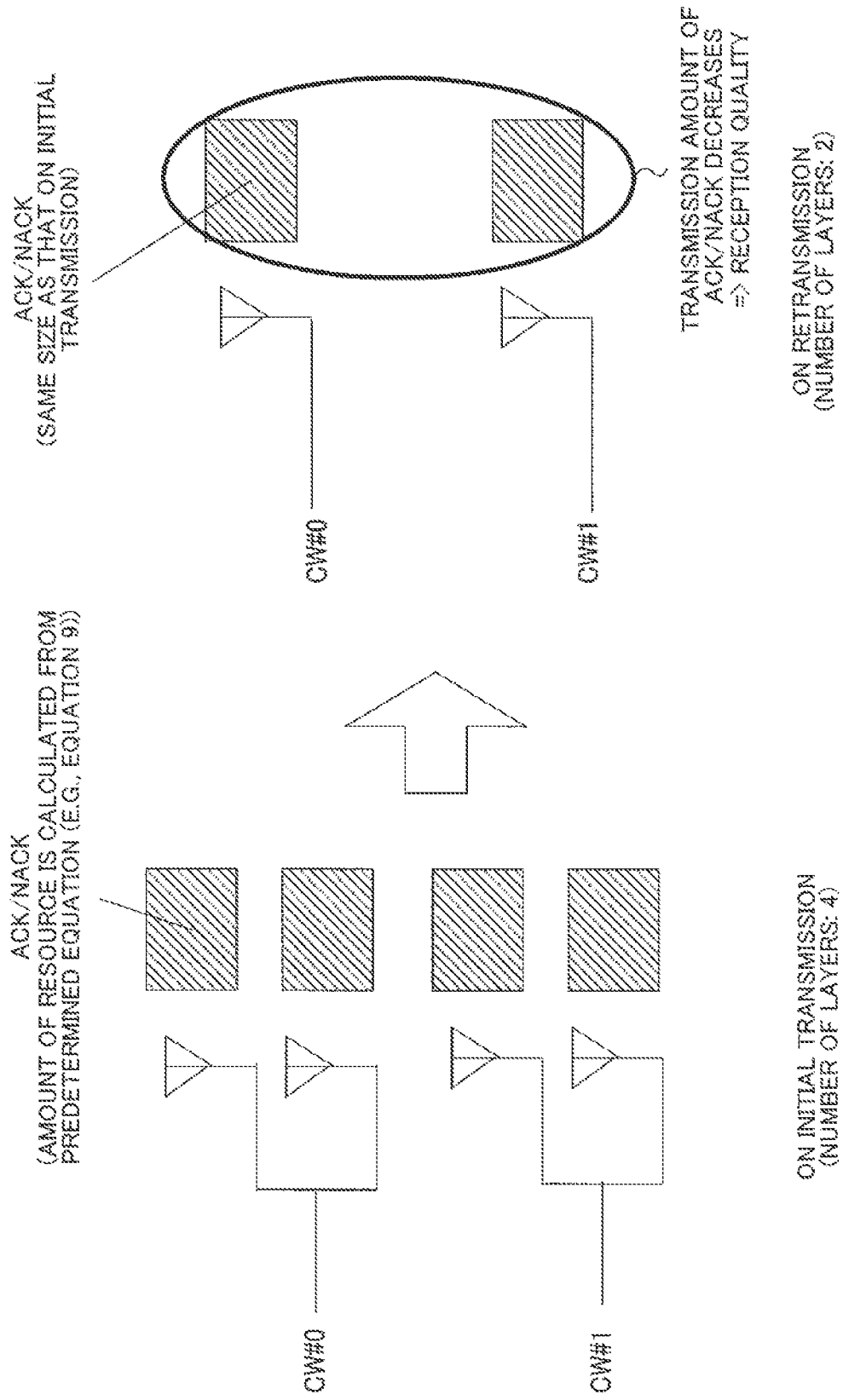
FIG. 9 shows a technical problem in the case where the number of layers differs between initial transmission and re-transmission according to Embodiment 3 of the present invention.

Since Determination Methods 1 to 6 (for example, equation 9) assume that the amount of the resource of control information is identical for each layer between initial transmission and retransmission, the total amount of the resource of control information in all the layers also decreases due to a reduction in the number of layers when the number of layers is changed on retransmission (for example, decreases). This results in the degradation of reception quality of control information on retransmission, as compared with that on initial transmission (for example, see FIG. 9). For example, as shown in FIG. 9, if allocation notification information (UL grant) is used to change the number of layers from four (on initial transmission) to two (on retransmission), the amount of resource of data signals decreases and thus the total amount of the resource of control information (for example, ACK/NACK signals) also decreases in all the layers.

resource amount determining section 204 re-sets the amount of the resource of control information on retransmission based on the number of layers in which each CW is allocated on retransmission. More specifically, on retransmission, resource amount determining section 204 does not use the amount of the resource per layer which was calculated on initial transmission, and instead, assigns the number of layers in which each CW is allocated on retransmission (i.e., current number) in equation 9 to re-calculate the amount of the resource per layer on retransmission (i.e., current amount). For the information other than the number of layers (i.e., $M_{CW\#0SC}^{PUSCH\text{-}initial}$, $M_{CW\#1SC}^{PUSCH\text{-}initial}$, $N_{CW\#0Symb}^{PUSCH\text{-}initial}$, $N_{CW\#1Symb}^{PUSCH\text{-}initial}$, $\Sigma K_r^{CW\#0}$ and $\Sigma K_r^{CW\#1}$), the numerical values used on initial transmission that have been set to meet a certain error rate requirement (for example, 10%) are used. More specifically, taking $L_{CW\#0} + L_{CW\#1} = L$ into account, equation 9 on retransmission (i.e., currently) can be transformed into equation 16.

[16]

$$Q_{CW\#0+CW\#1} = \left\lceil (O+P) \cdot \frac{1}{r_{CW\#0} \times L_{CW\#0}^{current} + r_{CW\#1} \times L_{CW\#1}^{current}} \cdot \beta_{offset}^{PUSCH} \right\rceil \quad \text{(Equation 16)}$$

$L_{CW\#0}^{current}$ and $L_{CW\#1}^{current}$ indicate the number of layers to which CW#0 and CW#1 are assigned on retransmission (i.e., currently), respectively, and $L_{CW\#0}^{initial}$ and $L_{CW\#1}^{initial}$ indicate the number of layers to which CW#0 and CW#1 are assigned on initial transmission, respectively. Since Determination Methods 1 to 6 assume that the number of layers is identical between initial transmission and retransmission, the number of layers is not considered on initial transmission and retransmission. Hence, the number of layers used in Determination Methods 1 to 6 represents the information on initial transmission, just like the number of bits in each CW and/or the amount of the resource in each CW.

Equation 16 is derived by multiplying each term in the denominator of equation 9 by the ratio of the number of layers on retransmission to that on initial transmission (i.e., $L_{CW\#0}^{current}/L_{CW\#0}^{initial}$, $L_{CW\#1}^{current}/L_{CW\#1}^{initial}$). Equation 17 is derived from equations 16 and 11.

[17]

$$Q_{CW\#0+CW\#1} = \quad \text{(Equation 17)}$$

$$\left\lceil (O+P) \cdot \frac{1}{r_{CW\#0} \times L_{CW\#0}^{initial} \times \frac{L_{CW\#0}^{current}}{L_{CW\#0}^{initial}} + r_{CW\#1} \times L_{CW\#1}^{initial} \times \frac{L_{CW\#1}^{current}}{L_{CW\#1}^{initial}}} \cdot \beta_{offset}^{PUSCH} \right\rceil =$$

$$\left\lceil (O+P) \cdot \frac{1}{\frac{\sum_{r=0}^{C_{CW\#0}-1} K_r^{CW\#0}}{M_{sc}^{PUSCH\text{-}initial(0)} \cdot N_{symb}^{PUSCH\text{-}initial(0)}} \times \frac{L_{CW\#0}^{current}}{L_{CW\#0}^{initial}} + \frac{\sum_{r=0}^{C_{CW\#1}-1} K_r^{CW\#1}}{M_{sc}^{PUSCH\text{-}initial(1)} \cdot N_{symb}^{PUSCH\text{-}initial(1)}} \times \frac{L_{CW\#1}^{current}}{L_{CW\#1}^{initial}}} \cdot \beta_{offset}^{PUSCH} \right\rceil$$

Figure 10:
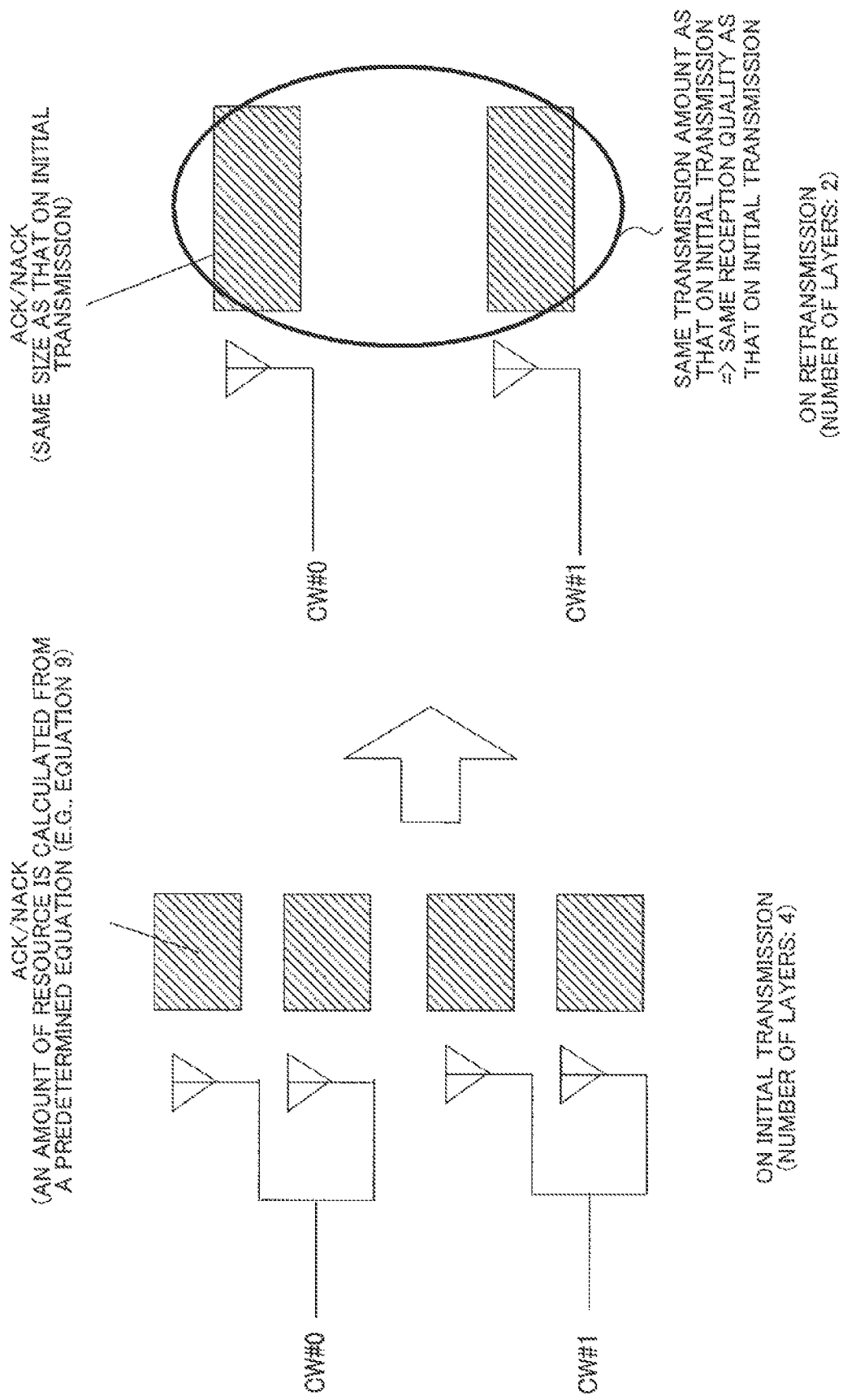
FIG. 10 shows a process for determining the amount of resource of control information according to Embodiment 3 of the present invention.

Equation 19 indicates that if the number of layers for transmitting data signals decreases, the amount of the resource of control information per layer increases. This means that the total amount of resource of layers containing control information is almost identical (i.e., the number of layers containing control information×the amount of the resource of control information per layer) is almost identical) between initial transmission and retransmission, thereby achieving the reception quality that is equal to or exceeds a certain level (required reception quality) for control information even on retransmission (see FIG. 10.).

This allows the amount of the resource of control information to be set in consideration of the number of layers on retransmission (currently) even if the number of layers transmitting data signals differs between initial transmission and retransmission. Thus, the degradation of reception quality of control information can be prevented without wasteful use of resource.

If the ratio of the number of layers on retransmission to that on initial transmission (i.e., the number of layers on retransmission/the number of layers on initial transmission) is 1/A fold (A: integer) for both of CW#0 and CW#1, equation 18 below may be substituted for equation 17.

[18]

$$Q_{CW\#0+CW\#1} = \left[ (O+P) \cdot \frac{1}{\frac{\sum_{r=0}^{C_{CW\#0}-1} K_r^{CW\#0}}{M_{sc}^{PUSCH-initial(0)} \cdot N_{symb}^{PUSCH-initial(0)}} + \frac{\sum_{r=0}^{C_{CW\#1}-1} K_r^{CW\#1}}{M_{sc}^{PUSCH-initial(1)} \cdot N_{symb}^{PUSCH-initial(1)}}} \cdot \beta_{offset}^{PUSCH} \times \frac{L^{current}}{L^{initial}} \right]$$ (Equation 18)

$L^{initial}$ and $L^{current}$ indicate the total number of layers on initial transmission and on retransmission, respectively. Unless the above-mentioned condition (i.e., the number of layers on retransmission/the number of layers on initial transmission)=1/A) is met, the amount of the resource of control information may be excessive or insufficient, which results in wasteful use of the resource or low quality. If the probability of not meeting the above condition is low, or if the system is designed so as to avoid such occurrence, resource amount determining section 204 may use equation 18 to calculate the amount of the resource of control information.

The case in which the total amount of resource (for example, the number of layers) on retransmission is reduced from that on initial transmission has been described above. The total amount of resource (for example, the number of layers) on retransmission may increase from that on initial transmission. In that case, resource amount determining section 204 may use equation 16, 17 or 18 to prevent the assignment of an excess amount of resource to control information.

The number of layers may be replaced with the number of antenna ports. For example, the number of layers on initial transmission in the above description (i.e., four layers in FIG. 10) is replaced with the number of antenna ports (four ports in FIG. 10), the number of layers on retransmission (currently) (two layers in FIG. 10) is replaced with the number of antenna ports on retransmission (currently) (two ports in FIG. 10), and the total number of layers is replaced with the total number of antenna ports. In other words, resource amount determining section 204 replaces the number of layers in equation 16, 17 or 18 with the number of antenna ports to calculate the amount of the resource of control information.

Note that if the number of layers is defined as the number of antenna ports through which different signaling sequences are transmitted, the number of layers is not always identical to the number of antenna ports. For example, when a rank-1 transmission is performed through four antenna ports, the number of layers is one since the same signaling sequence is transmitted though the four antenna ports. In this case, if a 4-layer transmission is performed using four antenna ports on initial transmission, while a 1-layer transmission (rank-1 transmission) is performed using four antenna ports on retransmission, the amount of the resource of control information need not be corrected. In contrast, if a 4-layer transmission is performed using four antenna ports on initial transmission, while a 1-layer transmission (using one layer) is performed using one antenna port on retransmission, the amount of the resource of control information needs to be corrected.

If the number of antenna ports used for retransmission decreases, transmission power per antenna port is increased to compensate for the decrease, thereby avoiding the correction of the amount of the resource of control information. For example, if the number of antenna ports is reduced from four to two, the transmission power per antenna port may be increased by 3 dB (i.e., doubled), and if the number of antenna ports is reduced from four to one, the transmission power per antenna port may be increased by 6 dB (i.e., quadruplicated).

If a precoding vector (or matrix) in which the number of antenna ports used on retransmission is identical to that on initial transmission is used, equation 11 or 14, for example, may be used. If a precoding vector (or matrix) in which the number of antenna ports used on retransmission is different from that on initial transmission is used, for example, the number of layers in equation 16, 17 or 18 may be used with the number of layers replaced with the number of antenna ports.

Equations 16 and 17 may be applicable to a case in which one of CWs is responded with ACK and the other CW is responded with NACK, resulting in a decrease in the number of CWs. More specifically, if CW#0 is responded with ACK, while CW#1 is responded with NACK on initial transmission, and only CW#1 is thus retransmitted, $L_{CW\#0}^{current}=0$ is assigned in equation 16 or 17 and the amount of the resource of control information is calculated from equation 19. Equation 19 indicates a case in which only CW1 is responded with NACK, but if only CW0 is responded with NACK, the CW1 information in equation 19 may be replaced with CW0 information.

[19]

$$Q_{CW\#0+CW\#1} = \left[(O+P) \cdot \frac{1}{\frac{\sum_{r=0}^{C_{CW\#1}-1} K_r^{CW\#1}}{M_{sc}^{PUSCH-initial(1)} \cdot N_{symb}^{PUSCH-initial(1)}} \times \frac{L_{CW\#1}^{current}}{L_{CW\#1}^{initial}}} \cdot \beta_{offset}^{PUSCH}\right]$$

(Equation 19)

If signals are transmitted in the two CWs, equation 11 or 14 may be used. If signals are retransmitted in a single CW, equation 19 may be used as exception processing. For example, if 4-antenna-port transmission is performed using the two CWs on initial transmission and if 2-antenna-port transmission is performed using a single CW on retransmission, equation 19 is used on retransmission. In the fallback mode, which is used when reception quality undergoes extreme degradation, for example, 1-antenna-port transmission may be performed using a single CW on retransmission, in which case equation 19 may be used as exception processing. Equation 19 may incorporate a correction value as shown in equation 20.

[20]

$$Q_{CW\#0+CW\#1} == \left[(O+P) \cdot \frac{1}{\frac{\sum_{r=0}^{C_{CW\#1}-1} K_r^{CW\#1}}{M_{sc}^{PUSCH-initial(1)} \cdot N_{symb}^{PUSCH-initial(1)}}} \times W \times \beta_{offset}^{PUSCH}\right]$$

(Equation 20)

W in equation 20 indicates a correction factor. Correction value W may be determined based on the number of layers (or number of antenna ports) for CW0 or CW1 on initial transmission and on retransmission. For example, the correction value W in equation 20 is the ratio of number of antenna ports to which CW0 or CW1 is assigned on retransmission to the number of antenna ports to which CW0 or CW1 is assigned on initial transmission. The correction value W may be included in the amount of offset $\beta_{offset}^{PUSCH}$. For example, the amount of offset $\beta_{offset}^{PUSCH}$ is determined based on the number of layers (or number of antenna ports) for CW0 or CW1 on initial transmission and on retransmission.

The case in which the calculation of the amount of resource on retransmission using CW information used in initial transmission has been described. A reason for calculating the amount of the resource on retransmission using CW information used in initial transmission is that the data signal error rate on retransmission may not be set to a constant value such as 10%. More specifically, on initial transmission, a base station allocates resource to each terminal such that the data signal error rate is 10%, while on retransmission the base station is likely to assign a smaller amount of resource to data signals than on initial transmission since it is sufficient as long as an improvement in the initial data signal error rate on retransmission is made. In other words, in the equation calculating the amount of the resource of control information, a reduction in the amount of the resource of data signals (i.e., $M_{SC}^{PUSCH-retransmission} \cdot N_{Symb}^{PUSCH-retransmission}$) on retransmission results in a reduction in the amount of the resource of control information, which leads to the degradation of reception quality of control information. To cope with this problem, the information on initial transmission is used to determine the amount of resource, thereby keeping the reception quality that is equal to or exceeds a certain level (i.e., required reception quality) for control information. Note that $\Sigma K_r$, $\Sigma K_r^{CW\#0}$ and $\Sigma K_r^{CW\#1}$ are identical between initial transmission and retransmission.

Even if a data error rate is set to 10% (0.1) on initial transmission, the data signal error rate may exceed 10% due to delay on retransmission (i.e., the error rate may further increase.) To address this problem, preferably, the correction value (K) is multiplied when the amount of the resource on retransmission is determined. For example, as shown in equation 21, the ratio of the number of layers for each CW on initial transmission ($L_{CW\#0}^{initial}$, $L_{CW\#1}^{initial}$) to the number of layers for each CW on retransmission ($L_{CW\#0}^{current}$, $L_{CW\#1}^{current}$) may be multiplied by a correction value specific to the term generated for each CW ($K_{CW\#0}$, $K_{CW\#1}$). Alternatively, as shown in equation 22, the ratio of the number of layers ($L^{initial}$) on initial transmission to the number of layers ($L^{current}$) on retransmission may be multiplied by the correction value (K). Correction values are not limited to the above-mentioned examples, and one or more time delays may be multiplied by a correction value.

[21]

$$Q_{CW\#0+CW\#1} == \left[(O+P) \cdot \frac{1}{\frac{\sum_{r=0}^{C_{CW\#0}-1} K_r^{CW\#0}}{M_{sc}^{PUSCH-initial(0)} \cdot N_{symb}^{PUScH-initial(0)}} \times \frac{L_{CW\#0}^{current}}{L_{CW\#0}^{initial}} \times K_{CW\#0} + \frac{\sum_{r=0}^{C_{CW\#1}-1} K_r^{CW\#1}}{M_{sc}^{PUSCH-initial(1)} \cdot N_{symb}^{PUScH-initial(1)}} \times \frac{L_{CW\#1}^{current}}{L_{CW\#1}^{initial}} \times K_{CW\#1}} \cdot \beta_{offset}^{PUSCH}\right]$$

(Equation 21)

[22]

$$Q_{CW\#0+CW\#1} = \text{(Equation 22)}$$

$$\left[ (O+P) \cdot \cfrac{1}{\cfrac{\sum_{r=0}^{C_{CW\#0}-1} K_r^{CW\#0}}{M_{sc}^{PUSCH-initial(0)} \cdot N_{symb}^{PUSCH-initial(0)}} + \cfrac{\sum_{r=0}^{C_{CW\#1}-1} K_r^{CW\#1}}{M_{sc}^{PUSCH-initial(1)} \cdot N_{symb}^{PUSCH-initial(1)}}} \cdot \beta_{offset}^{PUSCH} \times \cfrac{L^{current}}{L^{initial}} \times K \right]$$

Unlike Determination Methods 1 to 7, a restriction that the same number of layers as that on initial transmission should be always used on retransmission may be imposed. For example, changing the number of layers for each CW on retransmission with allocation information (UL grant) or the like may be prohibited. ACK/NACKs may be transmitted in the same number of layers as that on initial transmission even if the number of layers for each CW decreases on retransmission.

The embodiments of the present invention have been described above.

Other Embodiments (1) The MIMO transmission mode in the above-mentioned embodiments may be transmission mode 3 or 4, as set forth in LTE, that is, a transmission mode that supports transmission of two CWs, and the non-MIMO transmission mode may be any other transmission mode, that is, a transmission mode in which only single CW is transmitted. The description of the above-mentioned embodiments has assumed the MIMO transmission mode using a plurality of CWs and the non-MIMO transmission mode using a single CW. More specifically, as described above, the above description has been made on the assumption that signals are transmitted in a plurality of layers (or a plurality of ranks) in the MIMO transmission mode and that signals are transmitted in a single layer (or single rank) in the non-MIMO transmission mode. The transmission modes, however, should not be limited to these examples; signals may be transmitted through a plurality of antenna ports in the MIMO transmission mode (for example, the SU-MIMO transmission) and signals may be transmitted through a single antenna port in the non-MIMO transmission mode.

The code words in the above-mentioned embodiments may be replaced with transport blocks (TB).

(2) In the above-mentioned embodiments, ACK/NACKs and CQIs are used as examples of control information, but the control information is not limited to the information. Any information (control information) that requires higher reception quality than data signals is applicable. For example, CQIs or ACK/NACKs may be replaced with PMIs (information concerning pre-coding) and/or RI (i.e., information concerning ranks).

(3) The term "layer" in the above-mentioned embodiments refers to a virtual transmission path in the space. For example, in the MIMO transmission, data signals generated in each CW are transmitted in different virtual transmission paths (i.e., different layers) in the space at the same time and at the same frequency. The term "layer" may be referred to as a "stream."

(4) In the above-mentioned embodiments, a terminal that determines the amount of resource of control information based on a difference in coding rates between the two CWs to which control information is allocated (or coding rate ratio) has been described. A difference in MCS between the two CWs (or an MCS ratio) may be used, instead of a difference in coding rates between the two CWs to which control information is allocated (or coding rate ratio). Alternatively, a combination of a coding rate and a modulation method may be used as a coding rate.

(5) The above-mentioned amount of offset may be referred to as a correction factor, and the correction factor may be referred to as an amount of offset. Any two or three of the correction factors and amounts of offset ($\alpha_{offset}$ (L), $\beta_{offset}^{PUSCH}$ and $\gamma_{offset}$) used in the above-mentioned embodiments may be combined into one correction factor or offset.

(6) In the above-mentioned embodiments, the description has been given with antennas, but the present invention can be applied to antenna ports as well.

The antenna port refers to a logical antenna composed of one or more physical antennas. Thus, an antenna port does not necessarily refer to one physical antenna, and may refer to an antenna array composed of a plurality of antennas.

For example, in 3 GPP LTE, how many physical antennas are included in the antenna port is not specified, but an antenna port is specified as a minimum unit allowing the base station to transmit a different reference signal.

In addition, the antenna port may be specified as a minimum unit in multiplication of a weight of the precoding vector.

The number of layers may be defined as the number of different data signals transmitted concurrently in the space. Furthermore, the layer may be defined as a signal transmitted through an antenna port associated with data signals or reference signals (or as a communication path thereof in the space). For example, a vector used for weight control (precoding vector) that has been studied for uplink demodulation pilot signals in LTE-A has one-to-one relationship with a layer.

(7) The above-mentioned embodiments have been described by taking an example of the present invention being implemented by hardware, but the present invention may be implemented by software in cooperation with hardware.

Functional blocks used to describe the above-mentioned embodiments are typically achieved by LSIs, which are integrated circuits. The integrated circuits may be implemented individually into separate chips, or all or part of the integrated circuit may be implemented into one chip. Although such integrated circuits are referred to as LSIs herein, they may be called ICs, system LSIs, super LSIs or ultra LSIs, depending on the degree of integration.

The methods for manufacturing integrated circuits are not limited to LSIs, and dedicated circuits or general-purpose processors may be used to implement them. After LSI production, field programmable gate arrays (FPGAs) or reconfigurable processors that allow connection or setting of circuit cells within LSIs may be used.

If advancement in semiconductor technology or other technology derived therefrom leads to emergence of integrated circuit manufacturing technology that takes the place of LSI, obviously, such technology may be used to integrate functional blocks. Biotechnology may also be applicable.

The entire disclosure of the specifications, drawings and abstracts in Japanese Patent Application No 2010-140751 filed on Jun. 21, 2010 and Japanese Patent Application No 2010-221392 filed on Sep. 30, 2010 are incorporated herein by reference.

INDUSTRIAL APPLICABILITY

The present invention is useful in mobile communication systems and/or the like.

REFERENCE SIGNS LIST 100 base station
200 terminal
101 setting section
102, 103 coding and modulating section
104, 205 transmission signal generating section
105, 206 transmitting section
106, 201 antenna
107, 202 reception section
108, 208 radio processing section
109, 203 reception processing section
110 data reception section
111 ACK/NACK and CQI receiving section
204 resource amount determining section
207 transmission processing section

The invention claimed is:

1. An integrated circuit comprising:
circuitry, which, in operation, controls:
receiving a signal including ACK/NACK information indicating error correction results;
determining an amount of resource per layer for receiving the ACK/NACK information on all of a plurality of layers corresponding to a first code word and a second code word, the amount of resource per layer being determined by dividing a number of bits of the ACK/NACK information by a sum of first coding rate for the first code word and second coding rate for the second code word and by multiplying the division result with an offset amount for a physical uplink shared channel (PUSCH), with the first coding rate for the first code word being acquired by dividing a number of bits of the first code word by a product of a PUSCH transmission bandwidth for the first code word and a number of transmission symbols on each layer for the first code word, and the second coding rate for the second code word being acquired by dividing a number of bits of the second code word by a product of a PUSCH transmission bandwidth for the second code word and a number of transmission symbols on each layer for the second code word; and
extracting the ACK/NACK information from the received signal based on the amount of the resource per layer.

2. The integrated circuit according to claim 1, wherein a number of the plurality of layers is a sum of the number of layers allocated to the first code word and the number of layers allocated to the second code word.

3. The integrated circuit according to claim 1, wherein the amount of resource per layer for receiving the ACK/NACK information on the plurality of layers is determined according to the following equation:

$$Q_{CW\#0+CW\#1} = \left\lceil (O+P) \cdot \frac{L_{CW\#0} + L_{CW\#1}}{\frac{\sum_{r=0}^{C_{CW\#0}-1} K_r^{CW\#0}}{M_{CW\#0sc}^{PUSCH-initial} \cdot N_{CW\#0symb}^{PUSCH-initial}} \times L_{CW\#0} + \frac{\sum_{r=0}^{C_{CW\#1}-1} K_r^{CW\#1}}{M_{CW\#1sc}^{PUSCH-initial} \cdot N_{CW\#1symb}^{PUSCH-initial}} \times L_{CW\#1}} \cdot \beta_{offset}^{PUSCH} / L \right\rceil$$

where O indicates a number of bits in the ACK/NACK information, P indicates a number of error correction bits added to the ACK/NACK information, $\beta_{offset}^{PUSCH}$ indicates an amount of offset, L indicates a number of the plurality of layers, $L_{CW\#0}$ and $L_{CW\#1}$ each indicate a number of layers assigned to a corresponding one of code words #0 and #1, respectively, $M_{CW\#0SC}^{PUSCH-initial}$ and $M_{CW\#1SC}^{PUSCH-initial}$ indicate physical uplink shared channel (PUSCH) transmission bandwidths for the code words #0 and #1, respectively, $N_{CW\#0symb}^{PUSCH-initial}$ and $N_{CW\#1symb}^{PUSCH-initial}$ each indicate a number of transmission symbols for a corresponding one of the code words #0 and #1, respectively, and $K_r^{CW\#0}$ and $K_r^{CW\#1}$ each indicate a number of bits in each code block r for a corresponding one of the code words #0 and #1, respectively, and $C_{CW\#0}$ and $C_{CW\#1}$ each indicate a number of code blocks into which a data signal in a corresponding one of the code words #0 and #1, respectively, is divided.

4. The integrated circuit according to claim 3, wherein P is zero.

* * * * *